United States Patent
Chrumka

(10) Patent No.: US 8,140,138 B2
(45) Date of Patent: Mar. 20, 2012

(54) METHOD AND SYSTEM FOR PROVIDING VEHICLE-DIRECTED SERVICES

(75) Inventor: Edward P. Chrumka, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 160 days.

(21) Appl. No.: 12/368,277

(22) Filed: Feb. 9, 2009

(65) Prior Publication Data
US 2009/0149163 A1 Jun. 11, 2009

Related U.S. Application Data

(62) Division of application No. 09/997,761, filed on Nov. 29, 2001, now abandoned.

(60) Provisional application No. 60/263,568, filed on Jan. 22, 2001.

(51) Int. Cl.
*H04M 1/00* (2006.01)

(52) U.S. Cl. ............... 455/575.9; 455/552.1; 455/575.1; 455/566; 455/41.2; 455/569.1; 701/36; 701/117; 701/45; 701/60

(58) Field of Classification Search ............... 455/404.2, 455/414.3, 404
See application file for complete search history.

(56) References Cited

U.S. PATENT DOCUMENTS

| | | | |
|---|---|---|---|
| 6,330,499 B1 | 12/2001 | Chou et al. | |
| 6,374,177 B1 * | 4/2002 | Lee et al. | 701/200 |
| 2001/0014911 A1 | 8/2001 | Doi et al. | |
| 2002/0090932 A1 | 7/2002 | Bhatia et al. | |
| 2004/0203634 A1 | 10/2004 | Wang et al. | |
| 2005/0049781 A1 | 3/2005 | Oesterling | |
| 2005/0107673 A1 | 5/2005 | Ball | |
| 2005/0187682 A1 | 8/2005 | Gault et al. | |
| 2005/0267647 A1 | 12/2005 | Kamdar et al. | |
| 2006/0004589 A1 | 1/2006 | Ross et al. | |
| 2006/0022846 A1 | 2/2006 | Tummala | |

FOREIGN PATENT DOCUMENTS

| | | |
|---|---|---|
| WO | WO 99/45732 | 9/1999 |
| WO | WO 00/01172 | 1/2000 |
| WO | WO 00/04730 | 1/2000 |

OTHER PUBLICATIONS

U.S. Appl. No. 11/048,550, filed Feb. 1, 2005, Oesterling, et al.
U.S. Appl. No. 11/079,707, filed Mar. 14, 2005, Zambo, et al.
U.S. Appl. No. 11/142,778, filed Jun. 1, 2005, Watkins, et al.

* cited by examiner

*Primary Examiner* — Charles Appiah
*Assistant Examiner* — Randy Peaches
(74) *Attorney, Agent, or Firm* — Dierker & Associates, P.C.

(57) ABSTRACT

The present invention provides a method, system, and computer usable medium for directing service in a vehicle. A service request is received at a service management application from the vehicle. A vehicle location is also received. Vehicle delivery-enabling information is determined based on the service request and the vehicle location. The service corresponding to the service request is configured based on the vehicle delivery-enabling information. The configured service is sent to the vehicle.

13 Claims, 17 Drawing Sheets

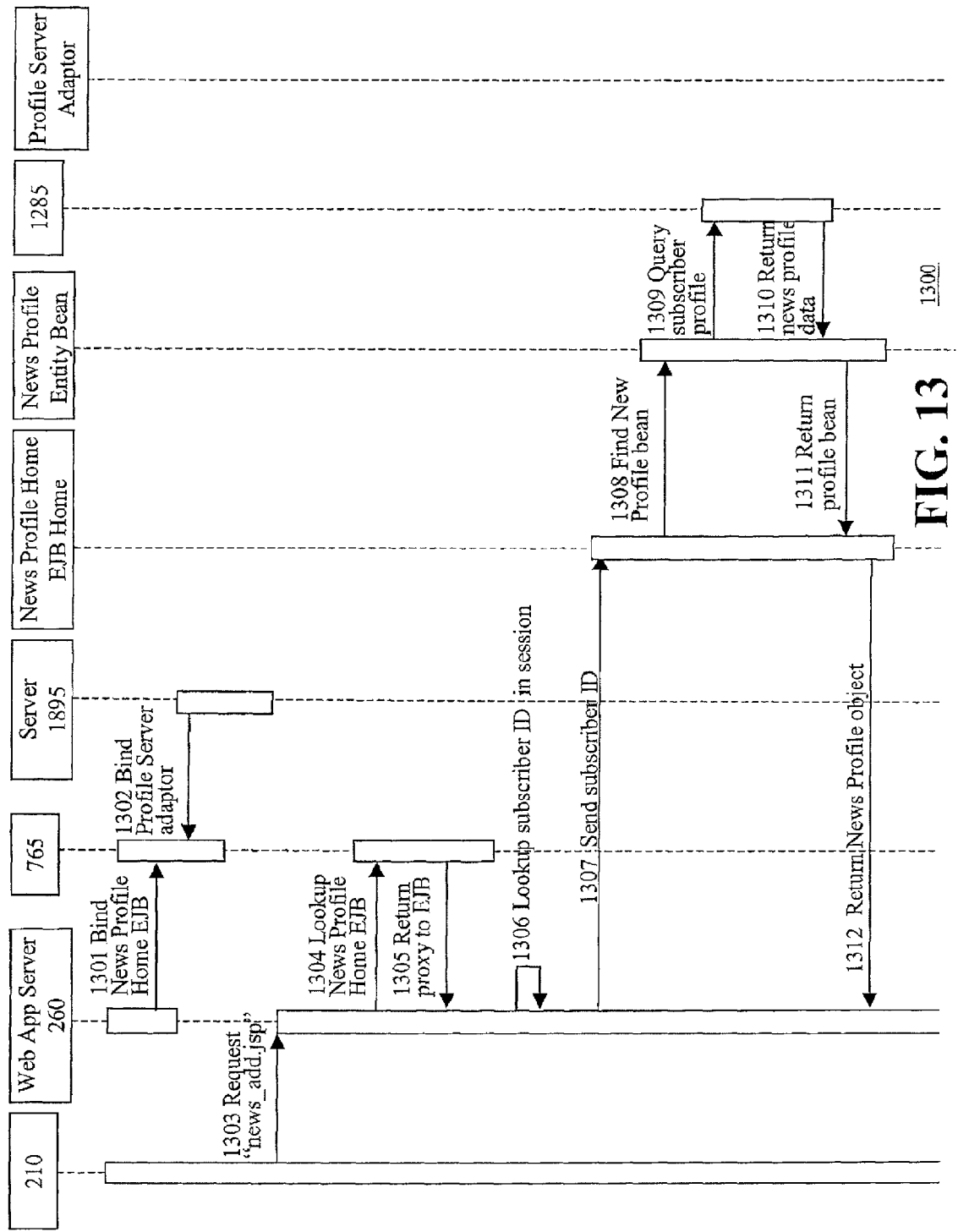

1400

METHOD AND SYSTEM FOR PROVIDING VEHICLE-DIRECTED SERVICES

CROSS-REFERENCE TO RELATED APPLICATIONS

This application is a divisional application of U.S. patent application Ser. No. 09/997,761, filed on Nov. 29, 2001, now abandoned which itself claims the benefit of U.S. Provisional Patent Application Ser. No. 60/263,568 filed on Jan. 22, 2001 entitled "METHOD AND SYSTEM FOR VEHICLE-DIRECTED INFORMATION SERVICE DELIVERY" by Edward P. Chrumka, each of which is incorporated by reference herein in its entirety.

BACKGROUND

This invention relates generally to delivering services, such as Internet-related or subscriber-requested services, in a vehicle such as an automobile. In particular this invention relates to a method and system for providing such vehicle directed services.

Current methods of providing information, services and advertising to a vehicle, such as an automobile, are centered on an in-vehicle approach. To facilitate this approach, some methods use in-vehicle hardware configurations or enablers such as onboard computers. Other methods use in-vehicle hardware and software configurations and enablers such as onboard databases of directions and in-vehicle computer platforms. Such methods require considerable lead time and resources. For example, analog wireless subsystems may be used to provide in-vehicle services. However, these subsystems do not provide adequate bandwidth to deliver a full range of commercial services in-vehicle. Moreover, such methods often do not provide information to the vehicle that is as up-to-date as is available. For example, on-board databases provide geographic information at the time the database is created and must be updated periodically to remain current. Such on-board databases are typically very expensive. Additionally, such methods do not provide a full range of services in-vehicle in a consistent manner.

It would be desirable therefore to provide a method for providing services to a vehicle that overcomes the above difficulties.

SUMMARY

A method for directing service in a vehicle is provided. A service request is received from the vehicle. A vehicle location is also received. Delivery-enabling information is determined based on the service request and the vehicle location. The service corresponding to the service request is configured based on the delivery-enabling information. The configured service is sent to the vehicle.

A signal including a vehicle identifier may be received from a vehicle communication component. The vehicle identifier may be a unique code including user identifier information and vehicle location. A list of delivery channels may be sent to a vehicle communication component. A channel may be selected from the list of delivery channels to deliver the configured service corresponding to the service request. The configured service may then be optimized for communication based on the determined delivery channel. A vehicle communication component in the vehicle may be configured based on the delivery-enabling information. A profile may then be created that includes delivery-enabling information. At least one pre-determined user input may be used to determine vehicle delivery information. Sending a service corresponding to a service request may comprise sending electronic mail to the vehicle communication component. The delivery-enabling information may be updated at the service management application while the application is in contact with the vehicle communication component.

A system for directing service in a vehicle is also provided. The system includes means for receiving a service request from the vehicle, means for receiving a vehicle location, means for determining vehicle delivery-enabling information based on the service request and the vehicle location, means for configuring the service corresponding to the service request based on the vehicle delivery-enabling information, and means for sending the configured service to the vehicle.

The system may include means for receiving a signal including a vehicle identifier from a vehicle communication component. The system may also include means for sending a list of delivery channels to a vehicle communication component. The system may also include means for selecting a channel from the list of delivery channels to deliver the configured service corresponding to the service request. The system may also include means for optimizing the configured service for communication based on the determined delivery channel. The system may also include means for configuring a vehicle communication component in the vehicle based on the delivery-enabling information. The system may also include means for creating a profile that includes delivery-enabling information.

A computer usable medium for directing service in a vehicle is provided. The medium includes computer readable program code that receives a service request from the vehicle. The medium also includes computer readable program code that receives a vehicle location. The medium also includes computer readable program code that determines vehicle delivery-enabling information based on the service request and the vehicle location. The medium also includes computer readable program code that configures the service corresponding to the service request based on the vehicle delivery-enabling information. The medium also includes computer readable program code that sends a configured service to the vehicle.

The medium may include computer readable program code that receives a signal including a vehicle identifier from a vehicle communication component. The vehicle identifier may be a unique code including user identifier information and vehicle location. The medium may also include computer readable program code that sends a list of delivery channels to a vehicle communication component. The medium may also include computer readable program code that selects a channel from the list of delivery channels to deliver the configured service corresponding to the service request. The medium may also include computer readable program code that optimizes the configured service for communication based on the determined delivery channel. The medium may also include computer readable program code that configures a vehicle communication component based on the delivery-enabling information. The medium may also include computer readable program code that creates a profile that includes delivery-enabling information. Determining vehicle delivery-enabling information may be based on at least one predetermined user input. The medium may also include computer readable program code that sends a service corresponding to a service request comprising sending electronic mail to the vehicle communication component. The medium may also include computer readable program code that updates the delivery-enabling information at the service management application while the application is in contact with the vehicle communication component.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION

Figure 1:
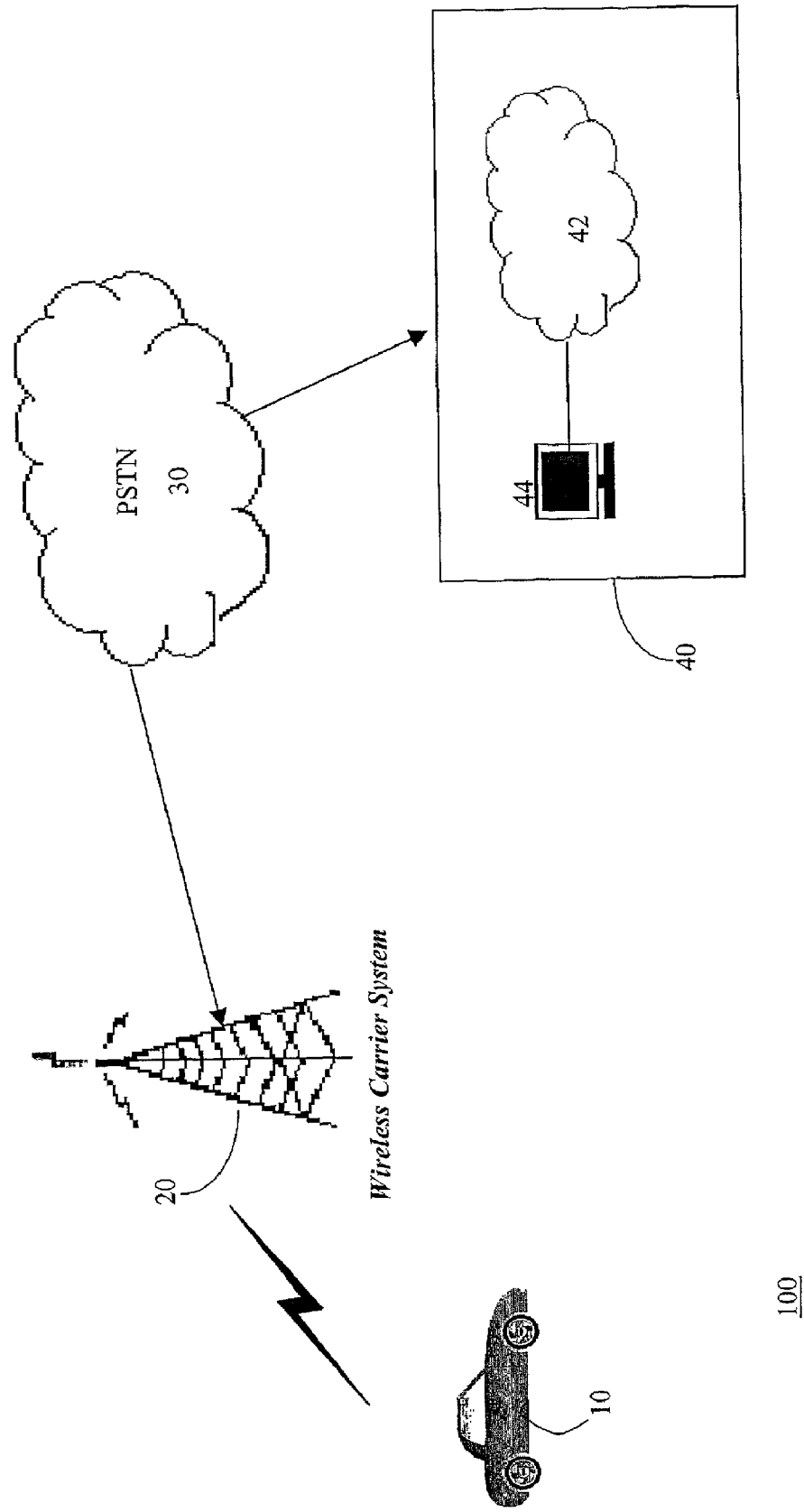
FIG. 1 is a schematic diagram of a system for providing services in a vehicle in accordance with the present invention.

FIG. 1 shows one embodiment of a system for providing services to a vehicle in accordance with the present invention at 100. The system 100 may include one or more vehicle clients 10, one or more carrier systems 20, one or more communication networks 30 and one or more service management subsystems 40. The service management subsystems may comprise one or more service management applications 42 and one or more managers 44.

Vehicle client 10 may be any suitable vehicle. For example, the vehicle may be an automobile or a passenger-carrying unit such as a bus or train. Alternatively, vehicle client 10 may be an occupant of the vehicle or any suitable client device contained in the vehicle. In one embodiment of the invention, vehicle client 10 is a mobile or portable device equipped to communicate with service management subsystem 40.

Carrier system 20 may be any suitable system for transmitting a signal from vehicle 10 to service management subsystem 40. Carrier system 20 may also transmit a signal from service management subsystem 40 to vehicle client 10. In one embodiment of the invention, carrier system 20 is a wireless carrier system as is well known in the art. Carrier system 20 may be, for example, a transmitter/receiver unit attached to vehicle client 10. Alternatively, carrier system 20 may be a separate transmitter/receiver carried by vehicle client 10.

Communication network 30 is any suitable system for communicating between vehicle client 10 and service management subsystem 40. In one embodiment of the invention, communication network is a public switched telephone network (PSTN). Alternatively, communication network 30 may be a multiprotocol Internet or intranet capable or transmitting voice and/or data in either analog or digital form or a combination of both.

Service management subsystem 40 is a system for managing a variety of services to be delivered to or from vehicle client 10. In one embodiment of the invention, service management subsystem 40 manages services that are distributable over a variety of channels. For example, services may be delivered via a live agent, such as a human advisor, or via a virtual agent, such as an interactive computer program. The structure of service management subsystem 40 may enable services to be delivered in a uniform manner regardless of the channel used for delivery or of the service being delivered. Service management subsystem 40 may maintain a consistent subscriber experience and "look and feel" across the products being delivered across the service distribution channels enabled.

Service management subsystem 40 may be any suitable hardware or software configuration, or combination of hardware and software that is configured to standardize each service being delivered via the subsystem 40 and to standardize each channel of delivery. In one embodiment of the invention, service management subsystem 40 standardizes each service and channel using personalization information from vehicle client 10. Thus, service management subsystem 40 may have a common profile mechanism across the services being delivered independent of the service distribution channel (live agent, virtual agent, web channel, speech channel) and of the service (news, weather, sports, stocks, etc.). In one embodiment of the invention, service management subsystem comprises one or more application components 42 and one or more service managers 44. For example, application 42 may be any suitable software application for managing one or more services. Service managers 44 may be any suitable hardware and/or software configuration or structure for executing applications 42.

Figure 2:
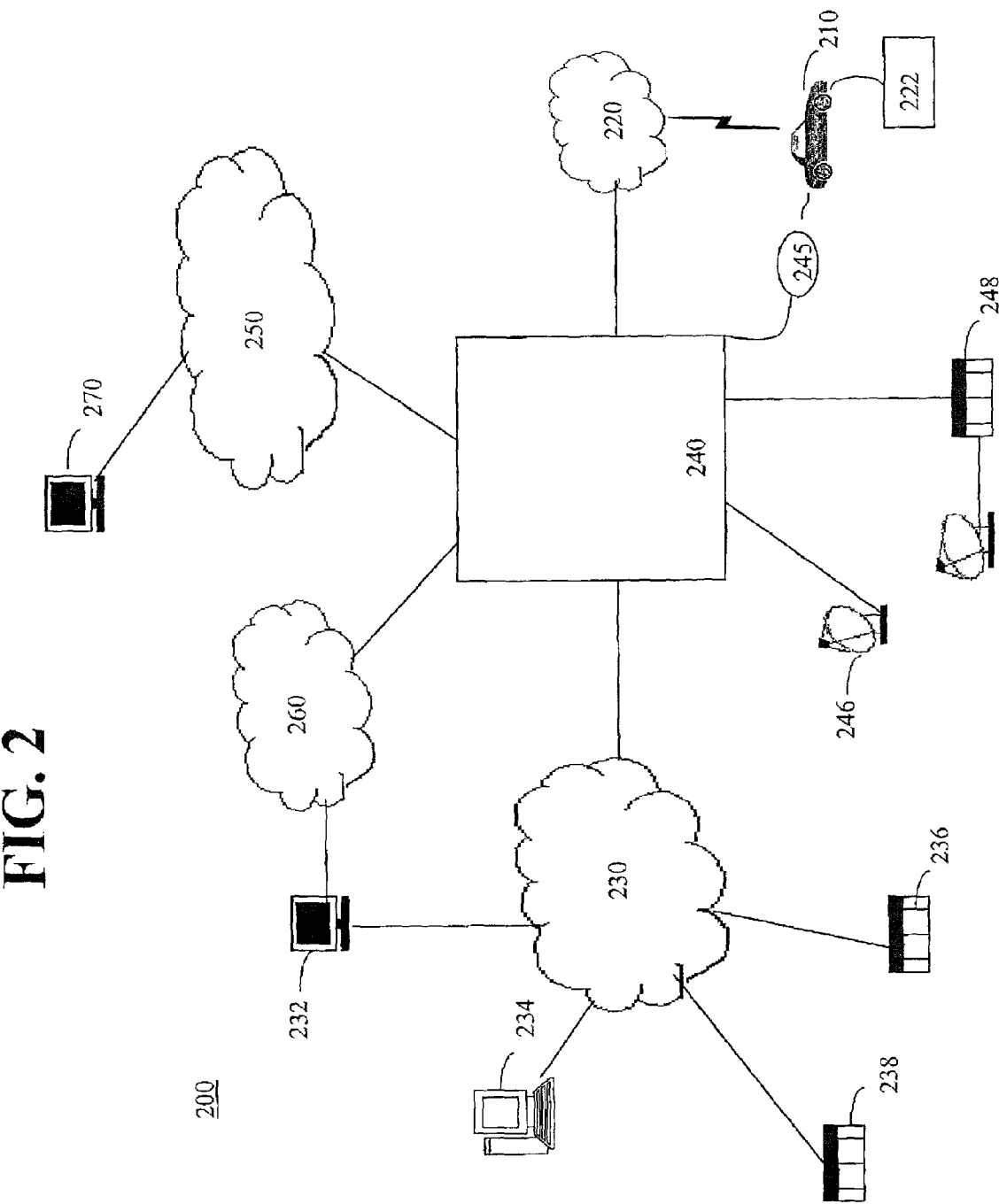
FIG. 2 is a schematic diagram of another embodiment of a system for providing services in a vehicle in accordance with the present invention.

FIG. 2 shows another embodiment of a system for providing services to a vehicle in accordance with the present invention at 200. Vehicle-directed service system 200 may include a subscriber 210 and a service management application 240. In the embodiment shown in FIG. 2, the service management subsystem may be in connection with a communication network 230, such as the Internet. Service management subsystem 240 may also be in communication with service applications or other service management subsystems. For example, in FIG. 2, service management subsystem 240 is also in communication with a subsystem for managing subscribers shown at 250. Service management subsystem 240 may also be in communication with a web-based service application or other web-based service management systems or web servers. For example, in FIG. 2, service management application 240 is in communication with a web channel 260.

In one embodiment of the invention, service management application may include an in-vehicle component 245. This in-vehicle component may be located in or on the vehicle, or may be in communication with vehicle client 210. In one embodiment of the invention, the in-vehicle component 245 may install a software algorithm, based on the type of call originated through a voice command, in order to optimize the talk path to subscriber management application 240. System 200 may also allow the subscriber to connect to a live administrator or advisor 270 through a spoken command acknowledged through the subscriber management application 240 voice user interface (VUI).

In one embodiment of the invention, subscriber 210 may have VUI access 222 through a PSTN 220. This may serve as the primary end user interface to service management application 240. This VUI access may allow subscribers in their vehicles equipped in accordance with the present invention to access a variety of services. For example, subscribers 210 may select and listen to news, sports, weather and stock quote information, and may browse and listen to their e-mail messages, using voice commands in a conversational manner. Furthermore, the subscriber may have the ability to interrupt or suspend the session if required. In one embodiment of the invention, connections are made to the service management application 240 through the public telephone system. In one embodiment of the invention, subscriber 210 may gain audio access to subscriber management application 240 by activating an in-vehicle speech recognition application. This speech recognition application may allow the subscriber to place hands-free cell phone calls.

Subscriber 210 may also have graphical user interface (GUI) access 232 through a communication network 230, such as the Internet. Such an interface may allow subscribers to access a variety of Internet and communication network-based services in accordance with the present invention. For example, subscriber 210 may access email via this interface. In one embodiment of the invention, subscribers connect to the service management application 240 through the Internet 230 using standard Web browsers.

Subscriber 210 may also have GUI access through a web channel 260. This interface may be used by subscribers to access a variety of services. For example, subscriber 210 may maintain one or more user profiles using web channel 260. Subscriber 210 may also set up user-related rules such as e-mail consolidation and filtering rules. This interface may also be used to access selected content services. Vehicle data, such as diagnostic codes and messages, can be consolidated and displayed using web channel 260. As with other components of system 200, information entered or accessed via web channel 260 may then be incorporated into new products and services for presentation over other channels in communication with service management subsystem 240. The subscriber 210 may connect to the web channel 260 using standard Web browsers. In one embodiment of the invention, standard web channel software interacts with the service management application to update subscriber profiles and/or to obtain information of interest. In one embodiment of the invention, the web channel 260 interface uses a dedicated connection to the service management system 240.

System 200 may also include one or more administrators 270. Administrator 270 may use GUI access to manage service management system 240 and information related to system 200. Administrator 270 may be, for example, a live advisor available to advise subscriber 210. Administrator 270 may also be, for example, an individual maintaining or administering service management subsystem 240. In one embodiment of the invention, administrator 270 accesses service management subsystem 240 via subscriber management subsystem 250. For example, administrator 270 may send configuration and subscriber information to service management system 240. Administrator 270 may also receive notifications of interesting events within system 200. In one embodiment of the invention, subscriber management subsystem 250 uses a dedicated connection between administrator 270 and service management system 240.

As seen in FIG. 2, system 200 may also include one or more message servers 234. These messages may be, for example, voice or text or e-mail mail messages. In one embodiment of the invention, message servers 234 communicate with service management application 240 via Internet 230. Thus, subscribers 210 may receive incoming email messages from, and send outgoing e-mail messages to, external mail transport agents using any suitable messaging protocol as is well known in the art. Message servers 234 may also be used to retrieve subscribers' e-mail from outside mail storage servers for consolidation into their e-mail accounts connected to system 200.

As seen in FIG. 2, system 200 may also include one or more news and or sports feeds 236. In one embodiment of the invention, feeds 236 are provided by a network news content provider. Feeds 236 may be used to receive and store audio news and sports stories for playback to interested subscribers 210. The primary interface between the speech channel and news content provider 236 may be via the Internet 230. In one embodiment of the invention, a satellite feed 246 serves as a backup mechanism.

As seen in FIG. 2, system 200 may also include one or more weather services 248. In one embodiment of the invention, the services are provided by any suitable weather reporting service. Weather services 248 may be used to receive and store regional and local weather information for playback to interested subscribers 210. Furthermore, the weather content can be delivered based on the vehicle location by coordinating the weather zone with the vehicle GPS location. The weather service 248 and/or content feed may be co-located with the service management system 240.

System 200 may also include one or more finance services 238. For example, stock quotes may be provided to the subscriber. Any suitable finance technology may be used to provide these services to interested subscribers. In the embodiment of FIG. 2, the finance information is obtained at the time of the request through Internet attached content sources or dedicated connections 230 as is known in the art.

System 200 may also include other services to be delivered in addition to news, weather, sports and finance services as described above. For example, yellow pages listings, special interest content (e.g., movie or restaurant reviews), or content related to the location of the vehicle (e.g. travel profiles of nearby tourist attractions) may all be delivered via system 200.

Figure 3:
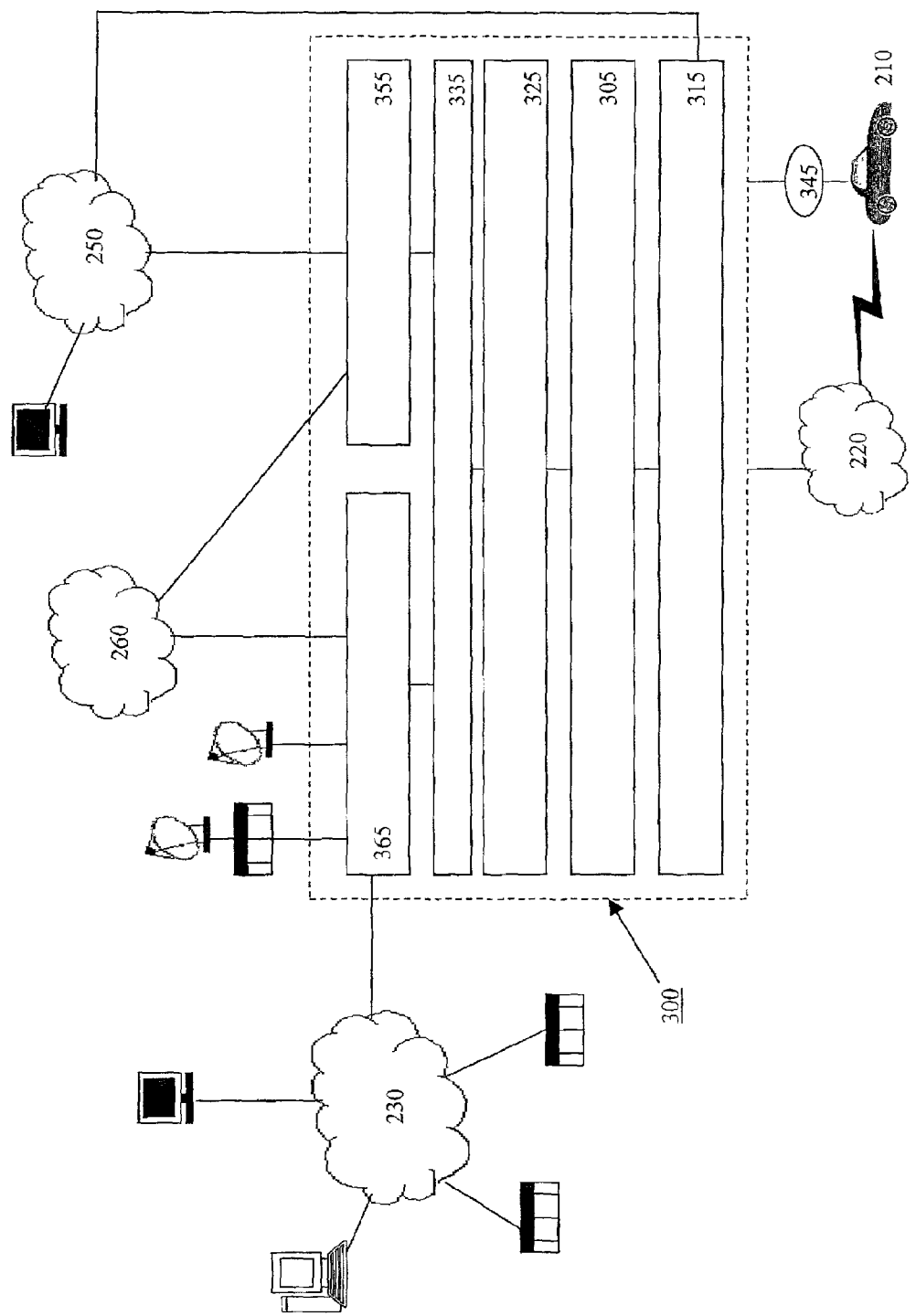
FIG. 3 is a schematic diagram of one embodiment of a service management subsystem for providing services in a vehicle in accordance with the present invention.

FIG. 3 shows one embodiment of a subsystem for providing services to a vehicle in accordance with the present invention at 300. This subsystem 300 may be used, for example, within system 200 as described above. In one embodiment of the invention, this subsystem 300 is used to interface with a public switched telephone network such as PSTN 220. For example, subsystem 300 may connect to PSTN 220 to communicate with subscriber 210 and vehicle. Subsystem 300 may also connect to subscriber management system 250.

Subsystem 300 may use subscriber management system 250 to validate a connection and to retrieve associated subscriber information.

In one embodiment of the invention, subsystem 300 may include an in-vehicle speech recognition component 345. Speech recognition component may be located in or on vehicle 210 and may be used to access components of system 200. For example, subscriber 210 may gain audio access to subscriber management application 250 by activating speech recognition component 345. Speech recognition component 345 may be, for example, any suitable speech recognition application as is known in the art. Speech recognition application 345 may allow the subscriber 210 to place hands-free cell phone calls. In one embodiment of the invention, the in-vehicle system 345 installs a software algorithm, based on the type of call originated through a voice command, in order to optimize the talk path to subscriber management application 250. Speech recognition component 345 may also allow the subscriber 210 to connect to a live administrator or advisor 270 through a spoken command acknowledged through the subscriber management application 250 VUI.

Subsystem 300 may include a front-end telephony component 315. Front-end telephony component may be any suitable telephony hardware or software for enabling service management application 240 to communicate with public telephone network 220. This may be, for example, a conventional analog or digital transceiver. Front-end telephony component 315 may also connect to the PSTN 220 for communication with subscriber 210 and/or the subscriber's vehicle. Front-end telephony component 315 may also connect to subscriber management system 250 for such services as connection validation and retrieval of associated subscriber information.

Front-end telephony component 315 may also connect to front-end speech-enabled/multimedia subsystem 305. In one embodiment of the invention, multimedia subsystem 305 comprises a plurality of telephony services. Speech-enabled multimedia subsystem 305 may, for example, enable VUI functions. Speech-enabled multimedia subsystem 305 may also handle VUI of service management application 240. Speech-enabled multimedia subsystem 305 may also connect to PSTN 220 to handle audio communications with subscribers 210 in their vehicles.

Speech-enabled multimedia subsystem 305 may be connected to script server and middle layer components 325. Speech-enabled multimedia subsystem 305 may be used to control the dialogs of script server and middle layer components 325. Script server and middle layer components 325 may be used to handle the actual dialog with the subscriber 210. The script server may interpret the dialog rules implemented in scripts. In one embodiment of the invention, the speech-enabled multimedia subsystem 305 converts dialog instructions into audio output for the subscriber 210 and interprets the subscriber's audio response for script server and middle layer components 325.

System 300 may also include a communications mechanism 335. Communications mechanism 335 may be any suitable communications hardware or software that provides a remote procedure call-like paradigm. Communications mechanism 335 may be based, for example, on socket-level communications. Communications mechanism 335 may also provide a basic load balancing capability.

System 300 may also include back end content services 365. These content services 365 may be any suitable content services, such as content servers or satellite feeds, which supply such products as the news, weather, sports, stock quotes and e-mail services and data to the subscribers. Content services 365 may handle interfaces to the outside world to acquire the data and to exchange e-mail messages. Content services 365 may present interfaces to other components of system 200, 300, including web server 260, script server and middle layer components 325 and Internet 230. Script server and middle layer components 325 may also access data content from content services 365.

System 300 may also include back end infrastructure services 355. Infrastructure services 355 may be any suitable hardware components or software applications that provide infrastructure and administrative support to the content services 365 and to script server and middle layer components 325. Infrastructure services 355 may also provide the facilities for administrators 270 to define such information as content categories and default user profiles for system 200. Infrastructure services 355 may also be used by subscribers 210 to define and maintain their own profiles. Script server and middle layer components 325 may also use infrastructure services 355 for infrastructure support.

Figure 4:
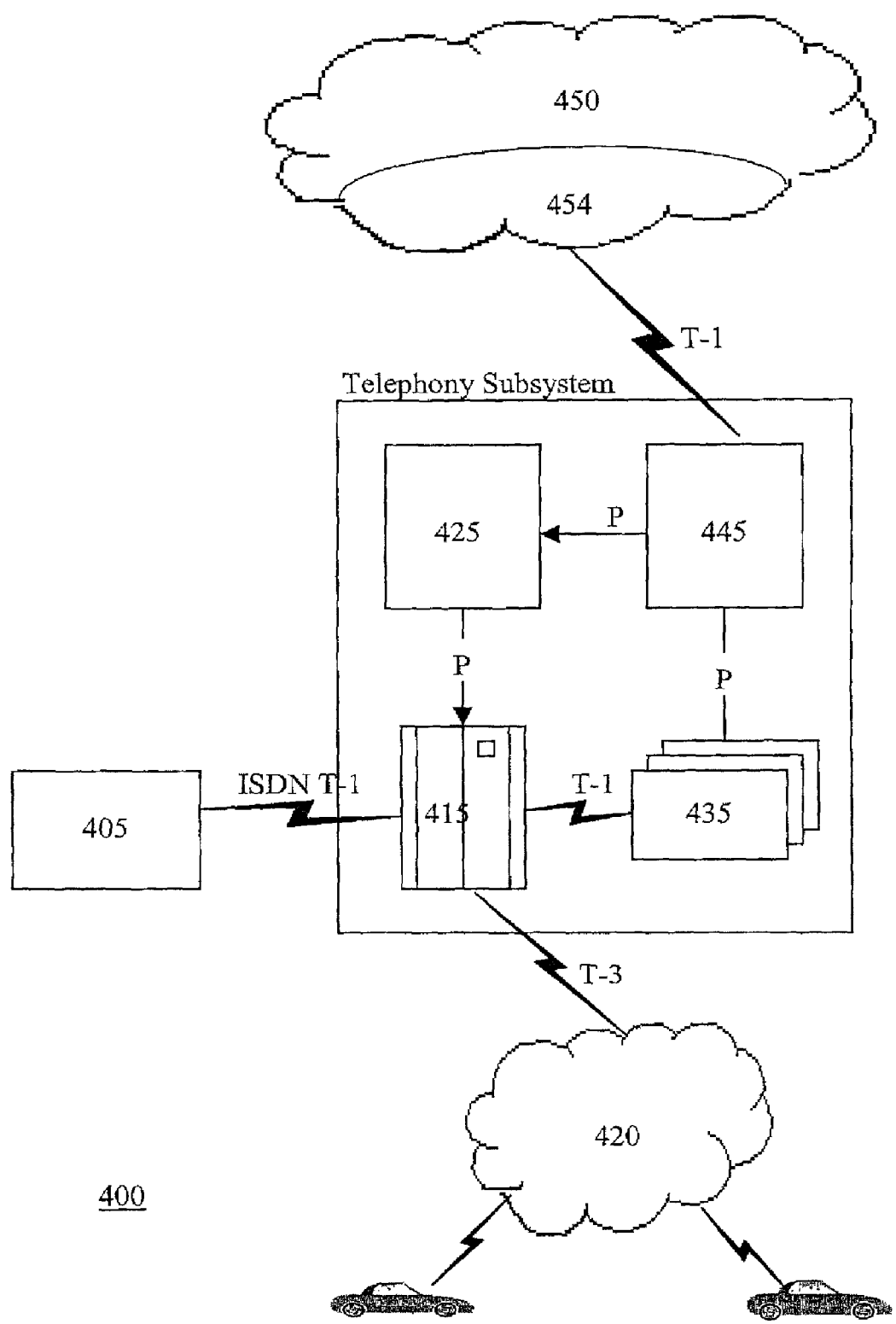
FIG. 4 is a schematic diagram of a communication subsystem for providing services in a vehicle in accordance with the present invention.

FIG. 4 shows one embodiment of a communication subsystem for providing services to a vehicle in accordance with the present invention at 400. For example, the role of the subsystem 400 may be to handle a call from subscriber 210 into system 200 described above. In the embodiment of FIG. 4, the communication subsystem 400 is a telephony subsystem.

In one embodiment of the invention, telephony subsystem 400 may be used to establish and maintain a communications circuit between PSTN 420 and a Voice User Interface (VUI) Subsystem 405. VUI subsystem 405 may be used to enable the dialog between the subscriber and the service management subsystem 40 described above. VUI subsystem 405 of communication subsystem 400 may be, for example, any suitable hardware and/or software interface to handle speech recognition and speech generation functions.

Subsystem 400 may have an external interface 420. In the embodiment of FIG. 4, this interface is a PSTN. The interface may be, for example, a high capacity connection (such as, for example, a T-3 connection) to a public phone system through which calls are placed. Calls from subscribers in their vehicles may originate by dialing a dedicated phone number that is terminated on a network-based call distribution mechanism or directly on a local switching system.

Communication subsystem 400 may also provide interfaces to other service management subsystem components. For example, communication subsystem 400 may communicate with a subscriber management subsystem 450. Subscriber management subsystem 450 may be, for example, a Wide Area Network interface to a Call Center system. Subscriber management subsystem 450 may be used to fetch subscriber information. For example, subscriber information may be stored as data in a suitable database and subscriber management subsystem 450 may be any suitable hardware and/or software configuration used to access this data. In one embodiment of the invention, subscriber management subsystem 450 may also comprise a management façade 454. Management façade 454 may be, for example, any suitable software and/or hardware configuration that enables consistent delivery of services across a product suite. In one embodiment of the invention, management façade 454 is configured to provide a uniform appearance and defined methodology to any entity wishing to integrate with the subscriber management subsystem 450.

Communication subsystem 400 may include a hardware element 415. This element may be, for example a switch that interfaces the service management subsystem 240 with a PSTN 420. Hardware element 415 may operate under the control of an external host program 425. Under the control of host program 425, the switch 415 may route incoming data calls to one or more modems 435. These modems may interface with one or more vehicle communications components 445. When directed to do so, hardware element 415 may reroute calls to appropriate channels in the VUI subsystem 405. In one embodiment of the invention, the interface between the PSTN 420 and the switch 415 is a set of engineered telecommunication facilities, such as, for example, ISDN T-1 lines, each of which can support multiple independent conversations. In one embodiment of the invention, hardware element 415 also communicates with VUI subsystem 405 using similar facilities.

The vehicle communication (Veh/Comm) component 445 of subsystem 400 is any suitable hardware or software configuration that serves to validate and coordinate handling of incoming calls. Veh/Comm component 445 may also retrieve associated subscriber information, and set up the telephony sessions between the subscriber and VUI Subsystem 405. In one embodiment of the invention, when a subscriber connects to the service management system 240 from a vehicle, the vehicle sends a data message containing an identifier, which is unique to the vehicle. This data message may be routed to Veh/Comm component 445 by the hardware component 415. For example, the message may be routed through a modem 435. Veh/Comm component 445 may send the unique identifier to subscriber management system 450 to retrieve associated subscriber information. Veh/Comm component 445 may then verify the connection using a challenge/response protocol with the vehicle. If the subscriber's information is retrieved successfully and the connection verified, Veh/Comm component 445 may send a command to the vehicle to switch to voice mode. It may also send a command to the host program 425, which controls the switch 415, to reattach the call to the VUI Subsystem 405. In the command sent to the host program, Veh/Comm component 445 may direct the host program and the switch 415 to attach a User-to-User Information (UUI) packet. In one embodiment of the invention, the UUI packet contains a session identifier, the current GMT offset for the vehicle, a flag indicating whether the user should be asked for a PIN and, if not, a Subscriber ID. The UUI packet may be routed to the VUI subsystem 405 that handles the call. The UUI packet may also be used to set up the user session. Veh/Comm component 445 may have IP connections with the modems 435 and the host program 425. Vehicle communication component 445 may also access the service management system 240 via an engineering data communication facility.

Host program 425 of subsystem 400 is any suitable program for managing components of subsystem 400. For example, host program 425 may serve to control the hardware component 415, which may be a switch. During subscriber connection sequences, host program 425 may direct initial call messages to modems 435. Host program may also interface the switch 415 with vehicle communication component 445. Host program 425 may also receive commands from Veh/comm component 445 to reattach incoming calls to VUI Subsystem 405. Host program 425 may forward these commands to the switch 415, and may include UUI attachments from Veh/Comm component 445 which are intended to be forwarded to VUI subsystem 405.

Figure 5:
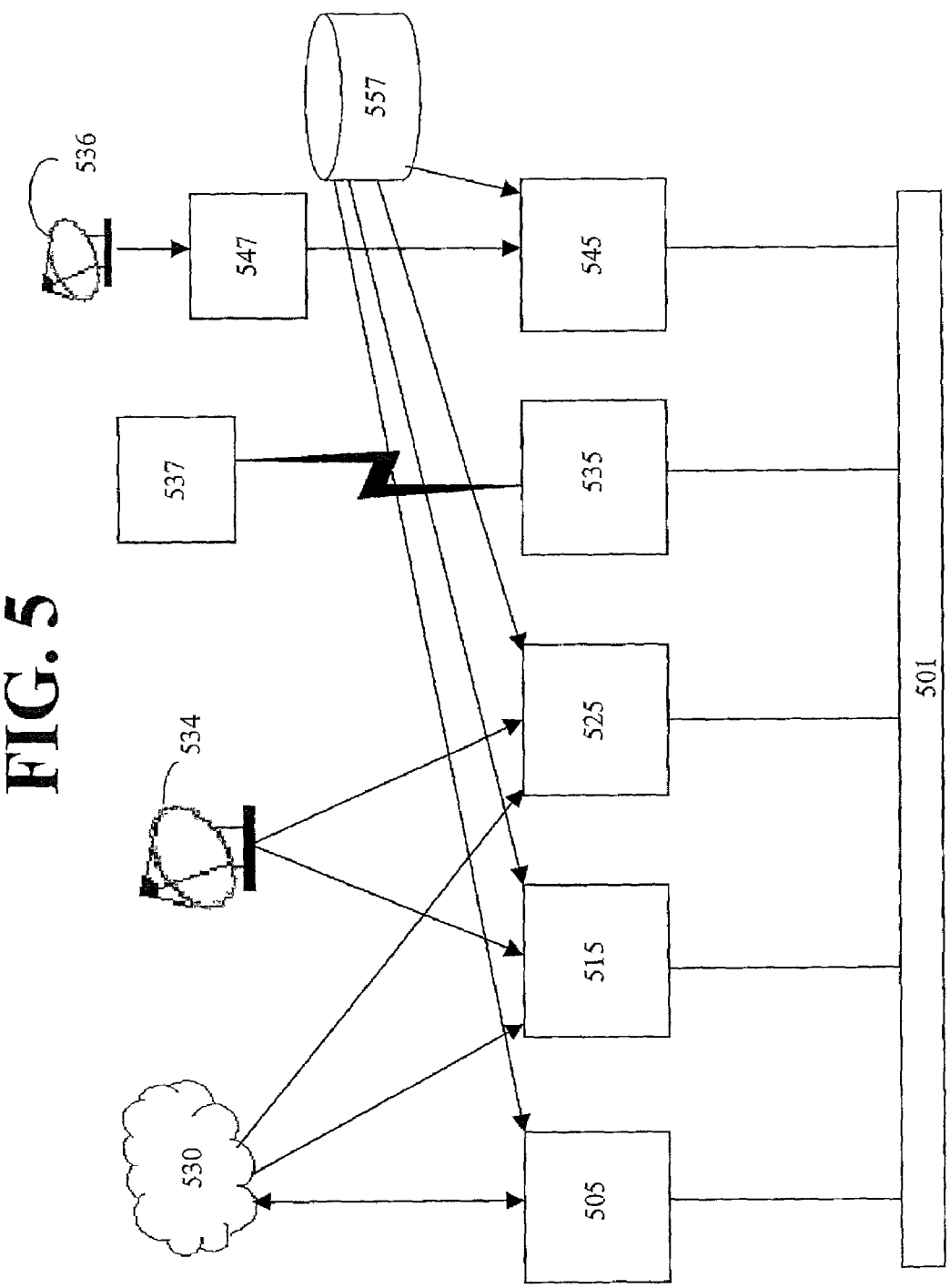
FIG. 5 is a schematic diagram of a content subsystem for providing services in a vehicle in accordance with the present invention.

FIG. 5 shows one embodiment of a content subsystem in accordance with the present invention at 500.

Components of content subsystem 500 may supply information that can be delivered to subscribers in their vehicles. These services may be delivered through any of the channels described above. For example, the services may be delivered through a live agent or across a wireless communication link to a mobile device, including a mobile portable device. Alternatively, the services may be delivered to subscribers via their Web browsers when the subscribers are logged into web channel 260, the Internet 230 or a suitable web server. In one embodiment of the invention, the information available in content subsystem 500 includes but is not limited to, basic news, sports news, weather, stock quotes, and e-mail services. Service management subsystem 300, described above, may be used to expose the content of content subsystem 500 for delivery to subscribers through a live agent or across a wireless communication link to a mobile device, such as a mobile portable device.

Subscribers 210 may specify the content that they are interested in by logging into web channel 260 and setting up interest profiles. This content may include content that a subscriber wishes to hear in his vehicle or content that a subscriber wishes to have available in any other manner from service management system 240. Interest profiles may be maintained by service management subsystem 240 in order to deliver the services in a timely, accurate, and highly personalized manner. These profiles may also control the default speech behavior of service management system 240. For example, after personalizing his profile, a subscriber may automatically get quotes for a selected set of stocks, or may hear recent news in areas of particular interest while connecting to service management system 240.

The components of content subsystem 500 may have similar high-level designs or may differ. In one embodiment of the invention, the content components may be of two types: content receptors 505, 515, 525, 535, 545 which receive and store the content information locally, and content providers 537, 547 which retrieve selected data from the local store and return them (or pointers to them) to requesting components that are working on behalf of logged-in subscribers. Alternatively, the content components may serve both these functions.

Content receptors 505, 515, 525, 535 and 545 may differ or may be similar in high-level design. For example, messaging content component 505 may have special needs differing from other content components 515, 525, 535 and 545. In one embodiment of the invention, messaging content receptor 505 may support unified messaging services. Alternatively messaging content receptor 505 may support electronic mail services. Meanwhile, content receptor 515 may, for example, support news services. Content receptor 525 may, for example, support sports news services. Content receptor 535 may, for example, support finance services such as stock quotes. Content receptor 545 may, for example, support weather services. Alternatively, as described above, subscriber 210 may select an entirely different suite of content receptors than those listed herein.

Content providers 537, 547 may be any suitable hardware and/or software devices that manage content as is known in the art. For example, content providers 537, 547 may be content servers. Content servers 537, 547 may provide delivery to one or more content receptors. A suitable content server may be defined as one that is able to obtain and manage the content in its domain. The types of information that can be requested and obtained may differ for each content server. However, the nature of the requests and responses may be similar. For example, in one embodiment of the invention, the subscriber passes in the specific attributes of the request to the content server 537, 547. For example, the attributes for selecting sports news might be "basketball, men's, top-25." Content names may then be developed internally to the service management system 200. These content names may then be mapped to multiple content providers if desired. For example, sports data can come from multiple commercial sources. The content server 537, 547 may the return a list of structures, with a separate structure for each service provider supplying data. Individual structures may contain a mix of data and pointers to data; e.g., content text, content filename, content URL, content audio filename, and a list of name/value pairs containing domain-specific field values. For example, stock quotes provider 537 may include the following defined fields: opening price, high, low, closing price, volume, 52-week high, and so forth. Filenames and URLs may be fully qualified. Although a common structure may be used, the fields that are actually returned depend on the content servers and the data required to manifest the product designed. Content may also be delivered from the Internet 530, satellites 534, 536, a hybrid of wireless and wireline network topologies, or one or more databases 557. Content may be provided by any suitable content provider as is known in the art.

In one embodiment of the invention, delivery façade 501 delivers actual content to subscribers 210. Delivery façade 501 may mask the details from their callers and provide a uniform interface to the rest of the system. Delivery façade 501 allows service providers to be changed and added, and individual services to be extended and modified, with minimal changes to the rest of the system. In one embodiment of the invention, delivery façade 501 is a service management façade as described above. Alternatively, delivery façade 501 may be implemented via CORBA. Alternatively, delivery façade may be implemented via a suitable remote messaging protocol. The internal interfaces between the content servers and their corresponding receptors/providers are as needed, and are transparent to non-subsystem components.

Figure 6:
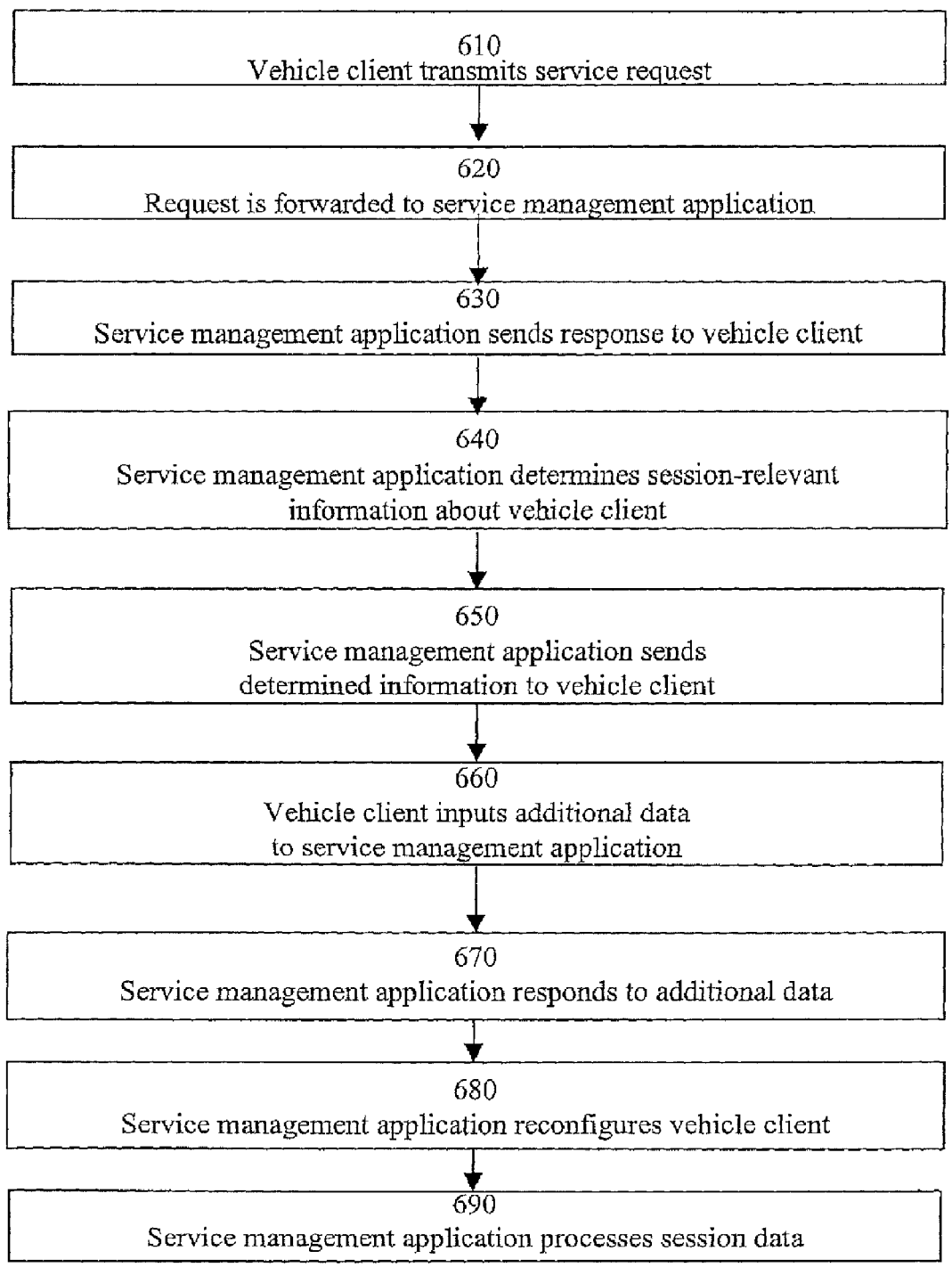
FIG. 6 is a flow diagram of one method for providing services in a vehicle in accordance with the present invention.

FIG. 6 shows a method for providing services to a vehicle in accordance with the present invention at 600.

At 610, a vehicle client sends a request for a service. Vehicle client may be, for example, a vehicle as described above or an occupant of the vehicle. For example, the request may be a request to subscribe the vehicle.

At 620, the request is forwarded to a service management application. The request may be forwarded, for example, via one or more of the interfaces described above, such as a communication network or PSTN or carrier network.

At 630, a response is returned to the vehicle client. The response may be a request for additional information ("Please identify yourself") or ("How may I help you?") Alternatively, the response may be an informative message. For example, the response may be a subscriber agreement describing terms and conditions to be complied with in order to become a subscriber to service management application and/or systems related to or in communication with service management application 240.

At block 640, service management application may determine information about the vehicle client. In one embodiment of the invention, this information is relevant to the current session between the vehicle client and the service management application. For example, service management application may determine a geographic location of the vehicle or a destination of the vehicle. This information may be used to provide services that are particularly relevant to the vehicle's current location or current situation. For example, service management application may also determine if the vehicle is in need of assistance by doing a diagnostic determination.

In one embodiment of the invention, the information determined at 640 may be sent to the vehicle client (as shown at block 650). This may be done, for example, for purposes of confirmation.

In one embodiment of the invention, the vehicle client may provide additional information to the service management application (as shown at block 660). For example, the vehicle client may add to or change the initial request. The vehicle client may also edit information determined by the service management application. Alternatively, the vehicle client may provide additional data such as a user name or subscriber identification.

In one embodiment of the invention, the service management application may respond to the information from vehicle client provided at block 660. For example, the application may send revised coordinates or updated information. Alternatively, the application may confirm a user name, subscriber information or destination.

In one embodiment of the invention, as seen at block 680, the application may reconfigure the vehicle or components of the vehicle in communication with system 200 if necessary.

In one embodiment of the invention, as seen at block 690, information gathered during the session may be processed by the service management application. For example, once a session is complete, data gathered during the session may be stored by the application. Alternatively, data gathered during the session may be used to update the vehicle client profile. Alternatively, the data may be used for evaluation purposes.

Figure 7:
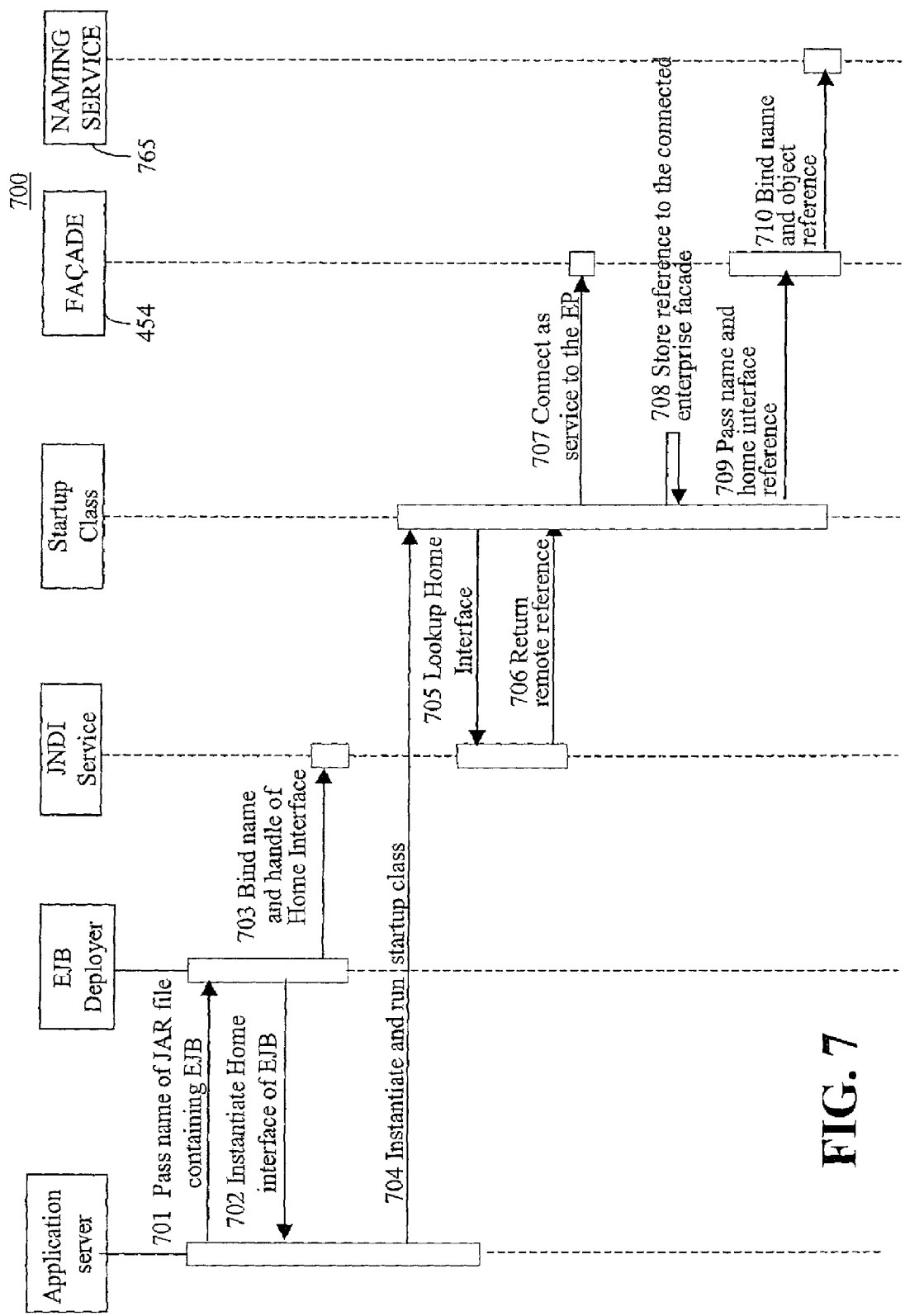
FIG. 7 is a sequence diagram of another embodiment of a method for providing services in a vehicle in accordance with the present invention.

FIG. 7 shows one embodiment of a method for registering enterprise java beans (EJBs) in accordance with the present invention at 700. Data to be made available to vehicle client 210 may be associated and stored with an appropriate EJB. At step 701, a suitable Web application server may pass the name of a JAR file containing an EJB to a suitable EJB deployer. At step 702, the EJB deployer may instantiate a home interface of the EJB. At step 703, a JNDI service may bind a name and handle for the home interface. At step 704, the JNDI service may then instantiate and run the startup class. At 705, the startup class may look up the home interface of the EJB. At 706, the startup class may return a remote reference for the EJB. This remote reference may be used by the startup class to connect as a service to the service management façade 454 (as seen at step 707). At step 708, a reference to the connected service management façade 454 may be stored. At step 709, the name and home interface reference may be passed to the service management façade 454. At step 710, the name and object reference may be bound from the facade 454 to a naming service 765 and/or other middleware components.

Figure 8:
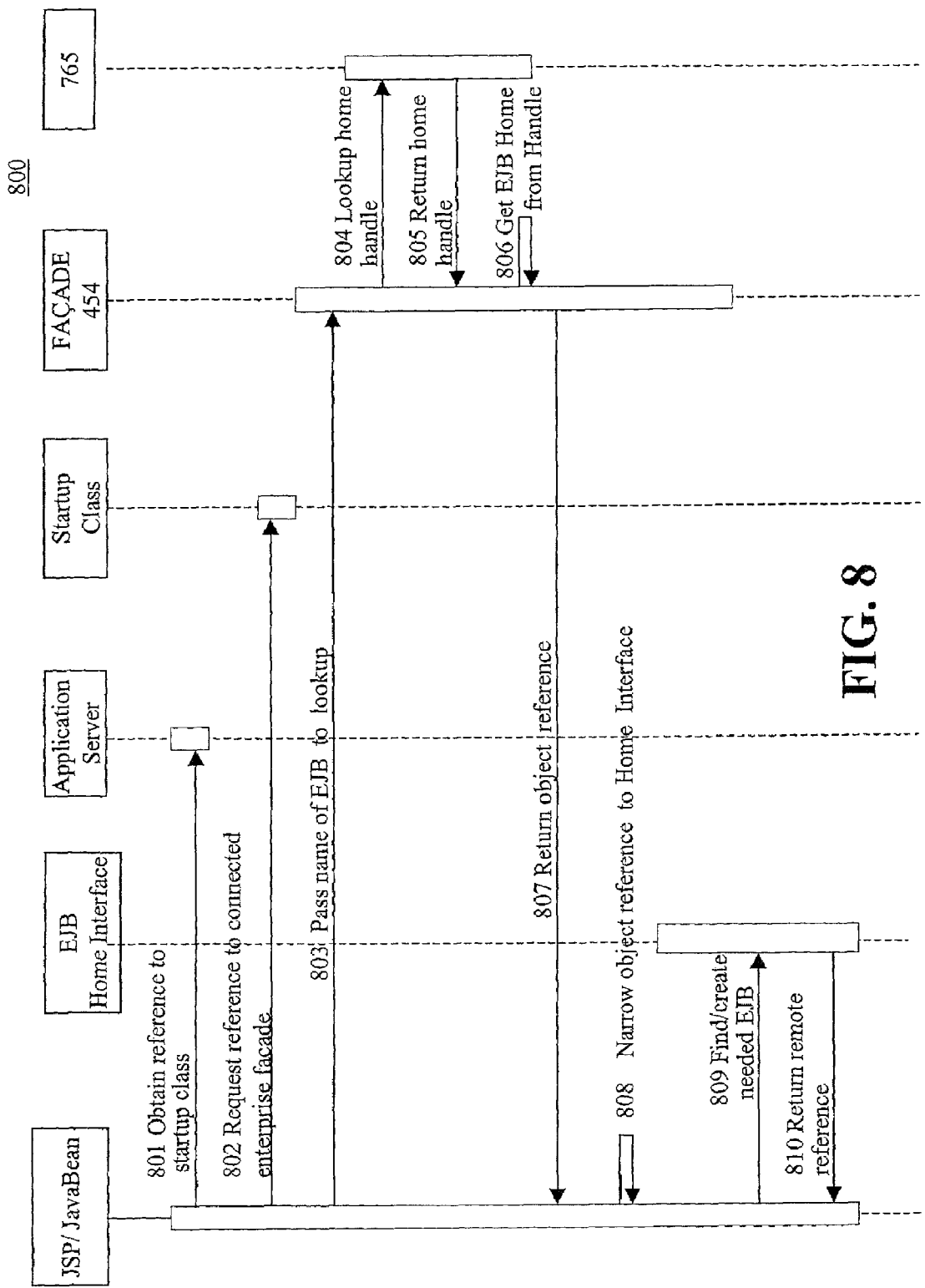
FIG. 8 is a sequence diagram of another embodiment of a method for providing services in a vehicle in accordance with the present invention.

FIG. 8 shows one embodiment of a method for finding services managed by service management façade 454 in accordance with the present invention at 800. In one embodiment of the invention, these services may be obtained from JSP/JavaBean/EJP sequences in the form of a reference to a startup class (as seen at step 801). At step 802, a reference to a connected facade 454 may be requested. At step 803, the name of an EJB to lookup may be passed from the JSP sequence to an application server startup class. At step 804, façade 454 may lookup a home handle associated with naming service 765. At step 805, naming service 765 or other middleware components may return the home handle to façade 454. At step 806, façade 454 may obtain information from the home handle provided at step 805. This information may take the form of, for example, an "EJBhome" object. At step 807, an object reference may be returned by façade 454. At step 808, the object reference determined at step 807 may be narrowed to a home interface. At step 809, JSP/JavaBean may find or create the needed EJB for the EJB home interface and an associated service. At step 810, the EJB home interface may then return the remote reference to be associated with the JSP/JavaBean sequence.

Figure 9:
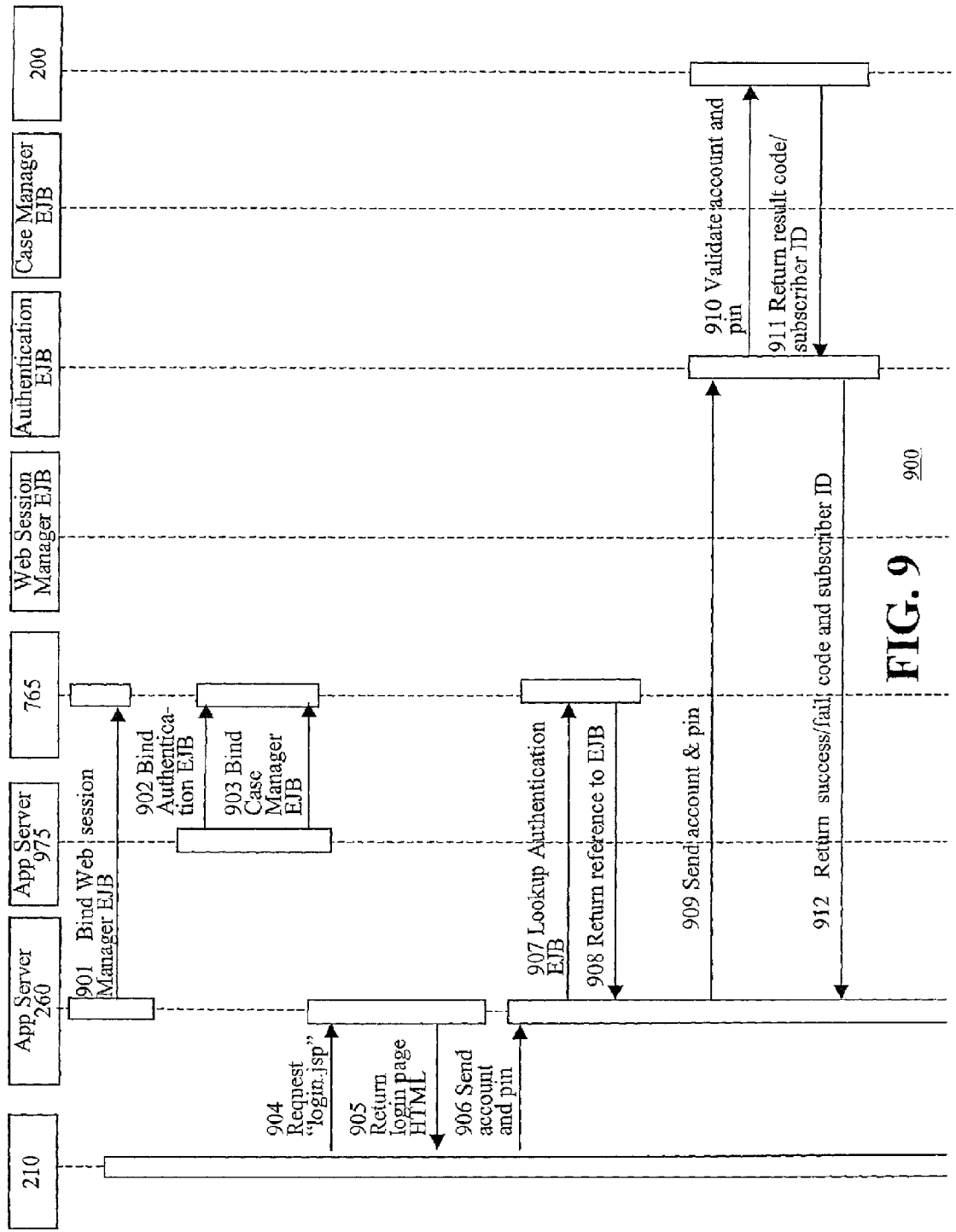
FIG. 9 is a sequence diagram of one embodiment of a method for providing subscriber services in a vehicle in accordance with the present invention.
Figure 9:
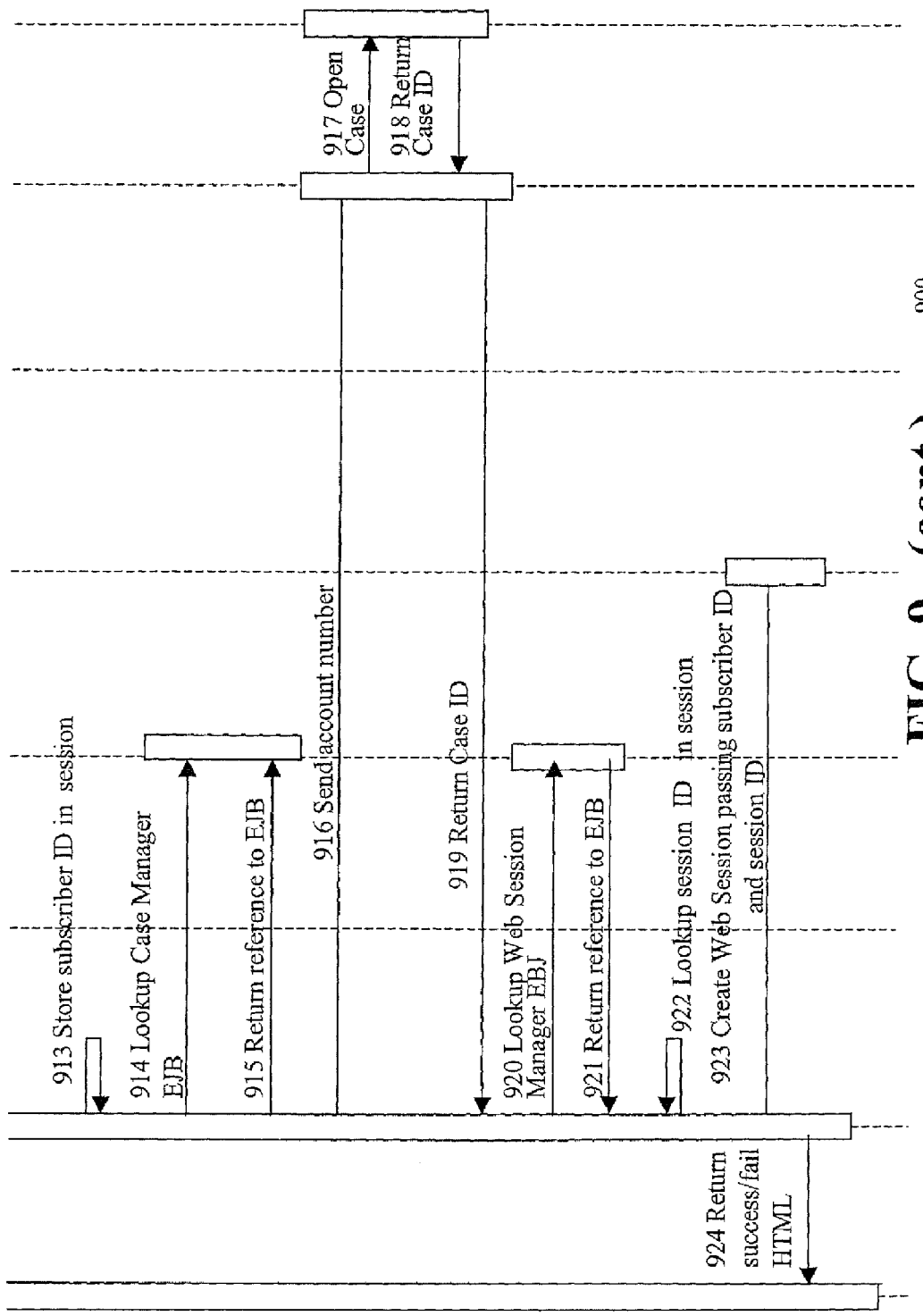

FIG. 9 shows one embodiment of a method for logging on to a service management system in accordance with the present invention at 900. For example, the routine of FIG. 9 may be used to logon to system 200 described above. At step 901, a web application server, such as channel 260, described above, may be used to bind a websession manager EJB to a naming service 765 or other middleware components. At step 902, a server 975 (connected to or in communication with service management system 200) may bind an authentication EJB to a naming service 765 or other middleware components. At step 903, server 975 may bind a case manager EJB. At step 904, a request may be made by subscriber 210 to login. This request may take the form of a login JSP. At step 905, a login page HTML may also be sent to subscriber 210. At step 906, subscriber 210 may send identification information, such as account and personal identification information to server 260. At step 907, server 260 may look up the authentication EJB from step 902. At step 908, a reference may be returned from middleware components 765 to server 260. At step 909, the information received from subscriber 210 at step 906 may be forwarded to an authentication EJB. At step 910, a case manager EJB may validate the information. At step 911, the service management system 200 may return a result. This result may take the form of a result code, such as a code indicating a successful or failed authentication attempt. The result may also include a subscriber ID. At step 912, the information of step 911 may also be returned to server 260. At step 913, server 260 may store the information of step 911 or part of the information. For example, server 260 may store subscriber identification. At step 914, server 260 may lookup a case manager EJB. At step 915, middleware components 765 may return a reference to EJB to server 260. At step 916, server 260 may send an account number to casemanager EJB. At step 917, case managerEJB may open a case. At step 918, the service management system 200 may return a case ID. At step 919, the case ID of step 918 may be forwarded to server 260. At step 920, server 260 may lookup websession manager EJB. At step 921, middleware components 765 may return a reference to EJB. At step 922, a session ID may be looked up for the session. At step 923, a websession passing subscribed ID and session ID may be created by application server 260. At step 924, a success/fail communication, such as an HTML page, may be returned to subscriber 210. Alternatively, the subscriber may be told in a voice message whether the login attempt was successful.

Figure 10:
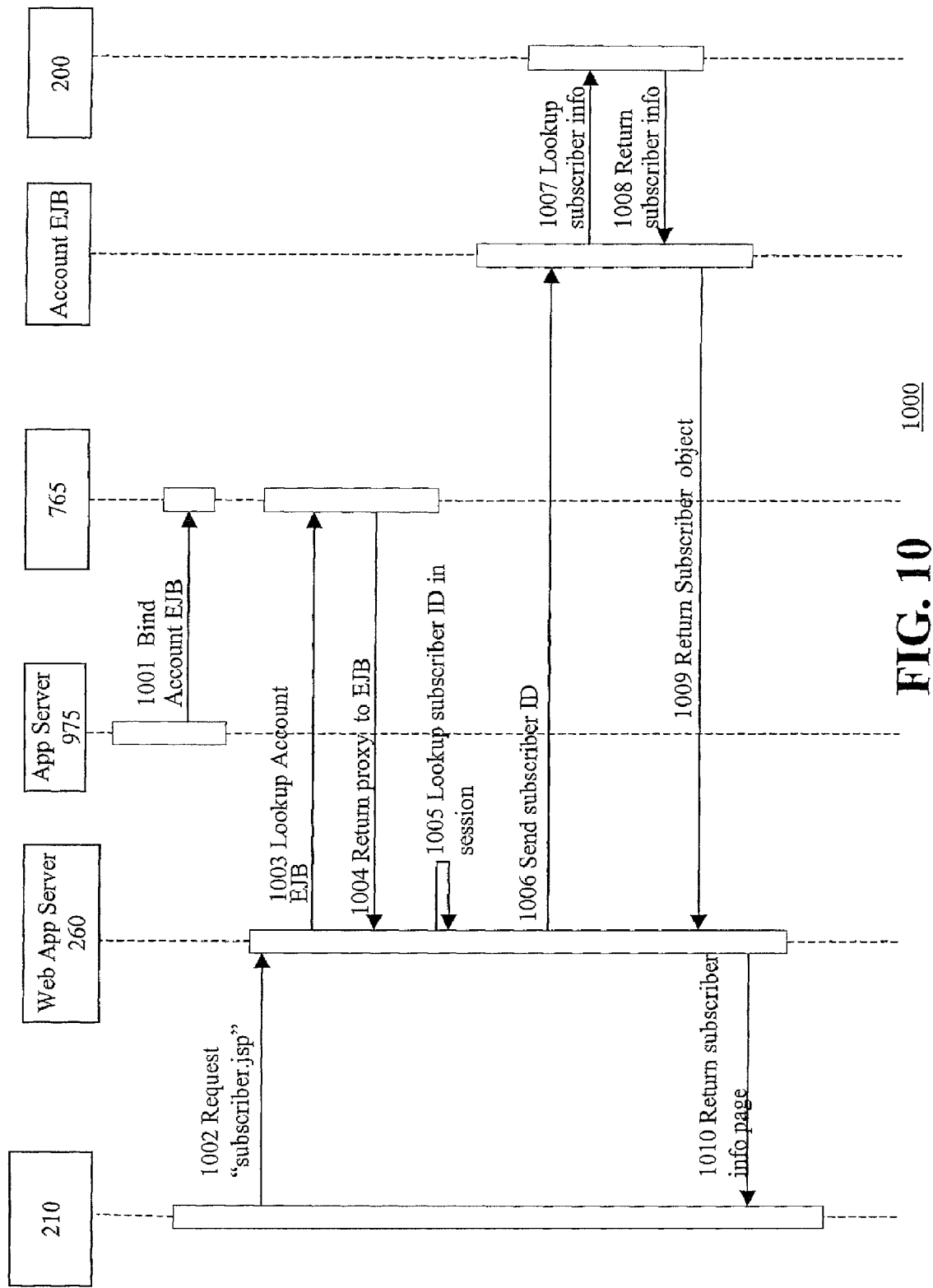
FIG. 10 is a sequence diagram of another embodiment of a method for providing subscriber services in a vehicle in accordance with the present invention.

FIG. 10 shows one embodiment of a method for retrieving subscriber information in accordance with the present invention at 1000. At step 1001, servers 975, connected to or in communication with service management system 200, may bind an account EJB to middleware components 765. At step 1002, subscriber 210 may request to access his subscriber information, for example in the form of a subscriber profile. This request may take the form of a subscriber JSP. At step 1003, server 260 may look up an account EJB for this request. At step 1004, middleware components 765 may return a proxy to EJB. At step 1005, server 975 may lookup a subscriber ID in session. At step 1006, server 260 may send the subscriber ID of step 1005 to an account EJB. At step 1007, account EJB may lookup subscriber information. At step 1008, the subscriber information may be returned to the account EJB. At step 1009, the subscriber information may be forwarded to server 260. This information may be forwarded in the form of a subscriber object. At step 1010, the subscriber information may be sent to subscriber 210. For example, the subscriber information may be sent in the form of a subscriber information page or voiced to the subscriber.

Figure 11:
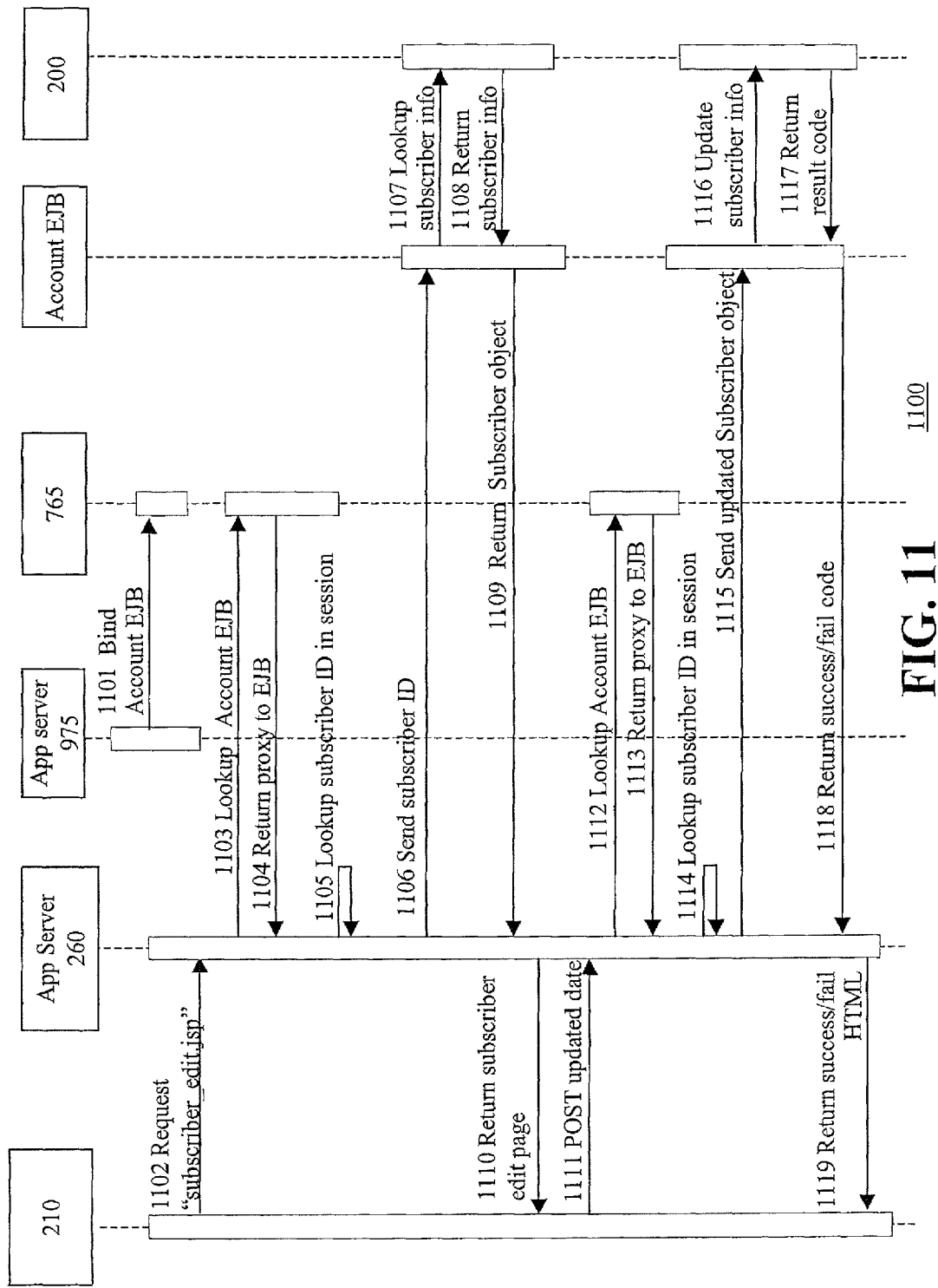
FIG. 11 is a sequence diagram of another embodiment of a method for providing subscriber services in a vehicle in accordance with the present invention.

FIG. 11 shows one embodiment of a method for updating subscriber information in accordance with the present invention at 1100. At step 1101, a server 975, connected to or in communication with service management system 200 may bind an account EJB to middleware components 765. At step 1102, subscriber 210 may request to update subscriber information. This request may take the form of a subscriber_add JSP. At step 1103, server 260 may look up an account EJB associated with the subscriber account. At step 1104, middleware components 765 may return a proxy to EJB. At step 1105, server 260 may look up subscriber information, such as a subscriber ID, in session. At step 1106, server 260 may send subscriber information, such as an ID to an account EJB. At step 1107, subscriber information may be looked up from service management system 200. At step 1108, subscriber information may be returned to account EJB. At step 1109, subscriber information may be forwarded to server 260. For example, this information may take the form of a subscriber object. At step 1110, subscriber information may be returned to subscriber 210. This may take the form of a subscriber edit page or a voice prompt. At step 1111, subscriber 210 may return updated information, for example, by editing the subscriber edit page sent at step 1110 or by speaking edits via a voice-recognition system. At step 1112, server 260 may lookup account EJB to middleware components 765. At step 1113, middleware components 765 may return proxy to EJB. At step 1114, subscriber identification may be looked up for the session. At step 1115, server 260 may send updated subscriber information to service management system 200. This updated information may take the form of a subscriber object. At step 1116, account EJB may update the subscriber's profile with the updated information. At step 1117, a result code may be returned. This result code may take the form of a failed update or a successful update. At step 1118, the result code may be returned to server 260. At step 1119, the result information may be returned to subscriber 210. For example, the result may be returned in the form of a success/fail HTML page or the result may be voiced to the subscriber.

Figure 12:
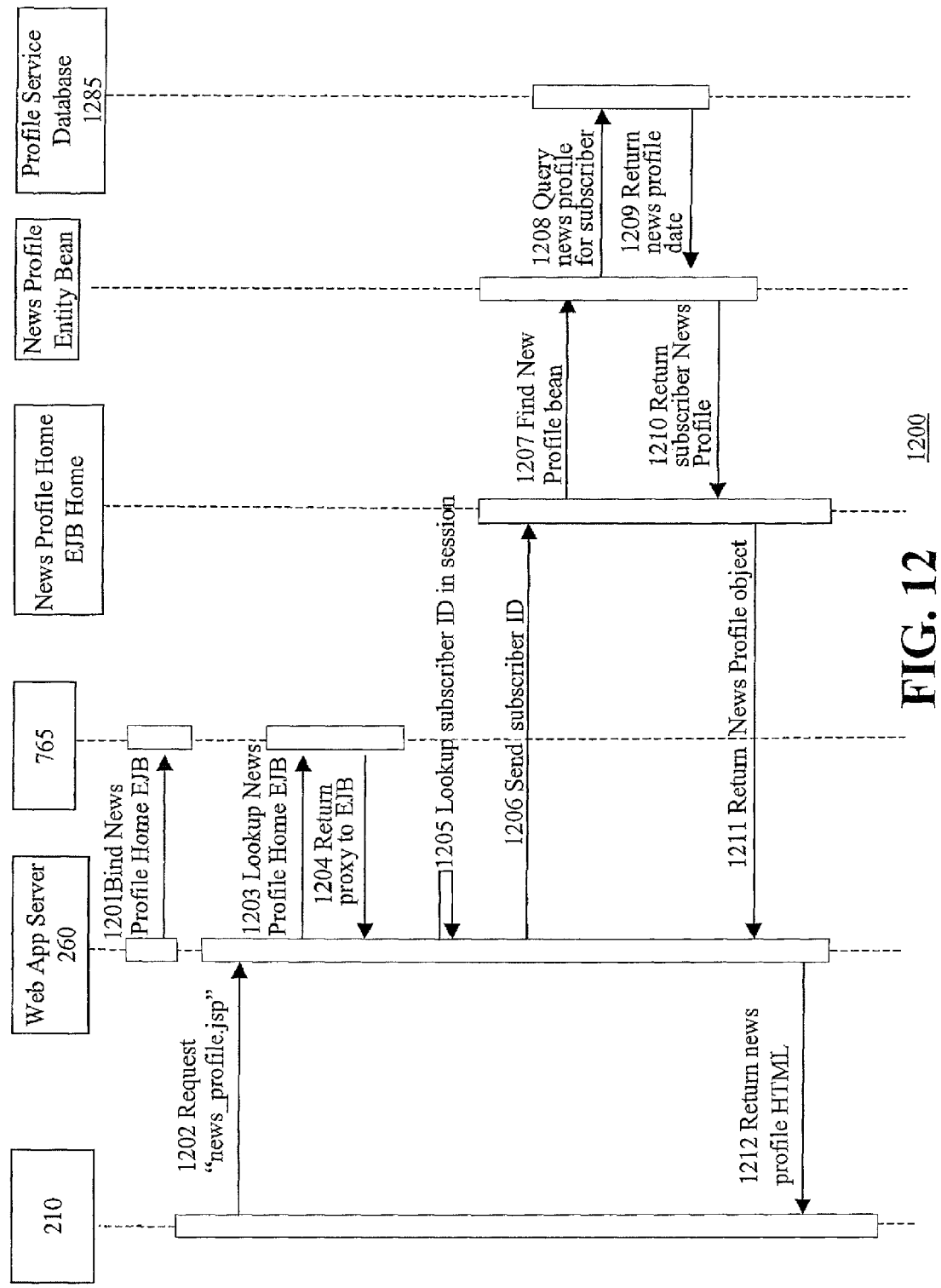
FIG. 12 is a sequence diagram of one embodiment of a method for providing information services in a vehicle in accordance with the present invention.

FIG. 12 shows one embodiment of a method for retrieving a news profile in accordance with the present invention at 1200. At step 1201, server 260 may bind a newsprofilehome EJB. At step 1202, subscriber 210 may send a request for news or information. This request may take the form of a news_profile.jsp. At step 1203, server 260 may lookup newsprofilehome EJB. At step 1204, middleware components 765 may return a proxy to EJB. At step 1205, subscriber information, such as a subscriber ID, may be looked up for the session. At step 1206, server 260 may send the subscriber ID of step 1205 to a newsprofilehome EJB. At step 1207, news profile information may be located. This information may take the form of a newsprofile bean. At step 1208, the service providing the news profile, such as service 236, 246 described above may be queried for the subscriber. In one embodiment of the invention, the news profile of the subscriber may be stored in a news profile database 1285. This database 1285 may also be queried for the subscriber. At step 1209, service 236, 246 or news profile database 1285 may return news profile data. At step 1210, news profile data obtained at step 1209 may be returned to newsprofilehome EJBhome. At step 1211, the news profile data obtained may be returned to server 260. This data may take the form of a newsprofile object. At step 1212, the news profile data obtained may be returned to subscriber 210. For example, the data may be returned as a news profile HTML page or as a voiced output.

Figure 13:
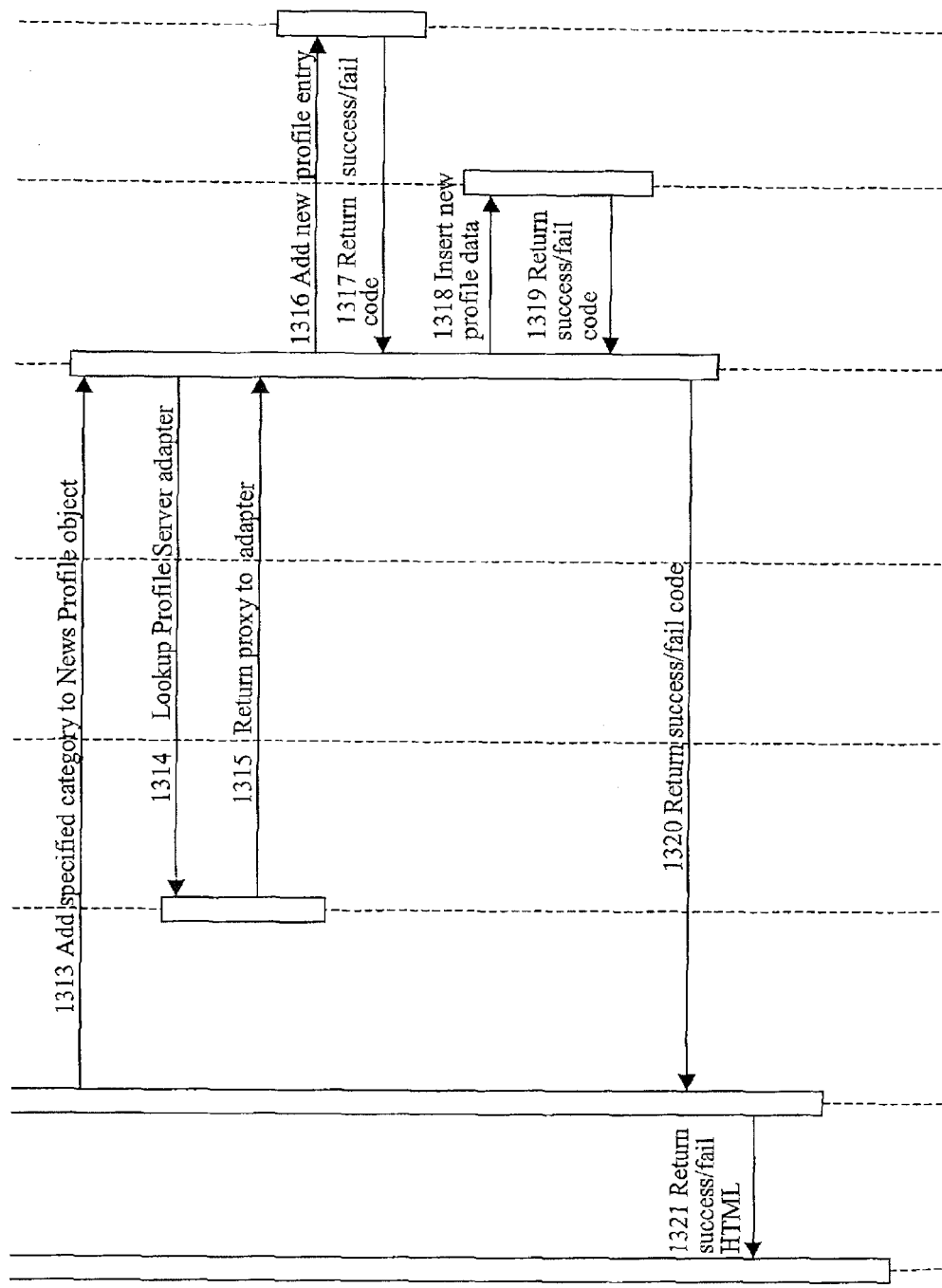
FIG. 13 is a sequence diagram of another embodiment of a method for providing information services in a vehicle in accordance with the present invention.

FIG. 13 shows one embodiment of a method for adding to a news profile in accordance with the present invention at 1300. At step 1301, server 260 may bind a news profile home EJB. At step 1302, a VUI channel server 1395 may bind a profile server adapter 1397. At step 1303, subscriber 210 may make a request to add to his news profile. This request may take the form of a news_add.jsp. At step 1304, server 260 may lookup a newsprofilehome EJB. At step 1305, middleware components 765 may return a proxy to EJB. At step 1306, server 260 may lookup a subscriber ID for the session. At step 1307, server 260 may send the subscriber ID to newprofilehome EJBHome. At step 1308, newsprofile home EJBHome may query a service profile database 1285, such as described above. This query may comprise a subscriber profile query. At step 1310, the database 1285 or an application associated with the database, such as news services 236, 256, may return news profile data. At step 1311, the news profile data may be returned to newsprofilehome EJBhome. The data may be returned, for example, in the form of a profile bean. At step 1312, the news profile data may be sent to server 260. The data may be sent, for example, in the form of a newsprofile object. At step 1313, server 260 may indicate a specified category to be added to the news profile object. At step 1314, a news profile entity bean may lookup a profile server adapter. At step 1315, middleware components 765 may return a proxy to the adapter looked up at step 1314. At step 1316, a newsprofile entity bean may add a new profile entry to the profile of the subscriber. This profile may be stored, for example in VUI channel host profile adapter. At step 1317, VUI channel host profile adapter 1397 may return a code indicating the status of the subscriber's profile. For example, the code may indicate if the news profile has been adapted successfully or has failed to be adapted. At step 1318, news profile entity bean may also insert new profile data in addition to the new profile entry of step 1316. At step 1319, the profile database 1385 or services 236, 246 may also return a code indicating the status of the subscriber's profile. For example, the code may indicate that the new profile data has been successfully added or has failed to be added. At step 1320, this code may be forwarded to server 260. At step 1321, the information from the code may be returned to subscriber 210. This may take the form of, for example an HTML page or a voiced confirmation.

Figure 14:
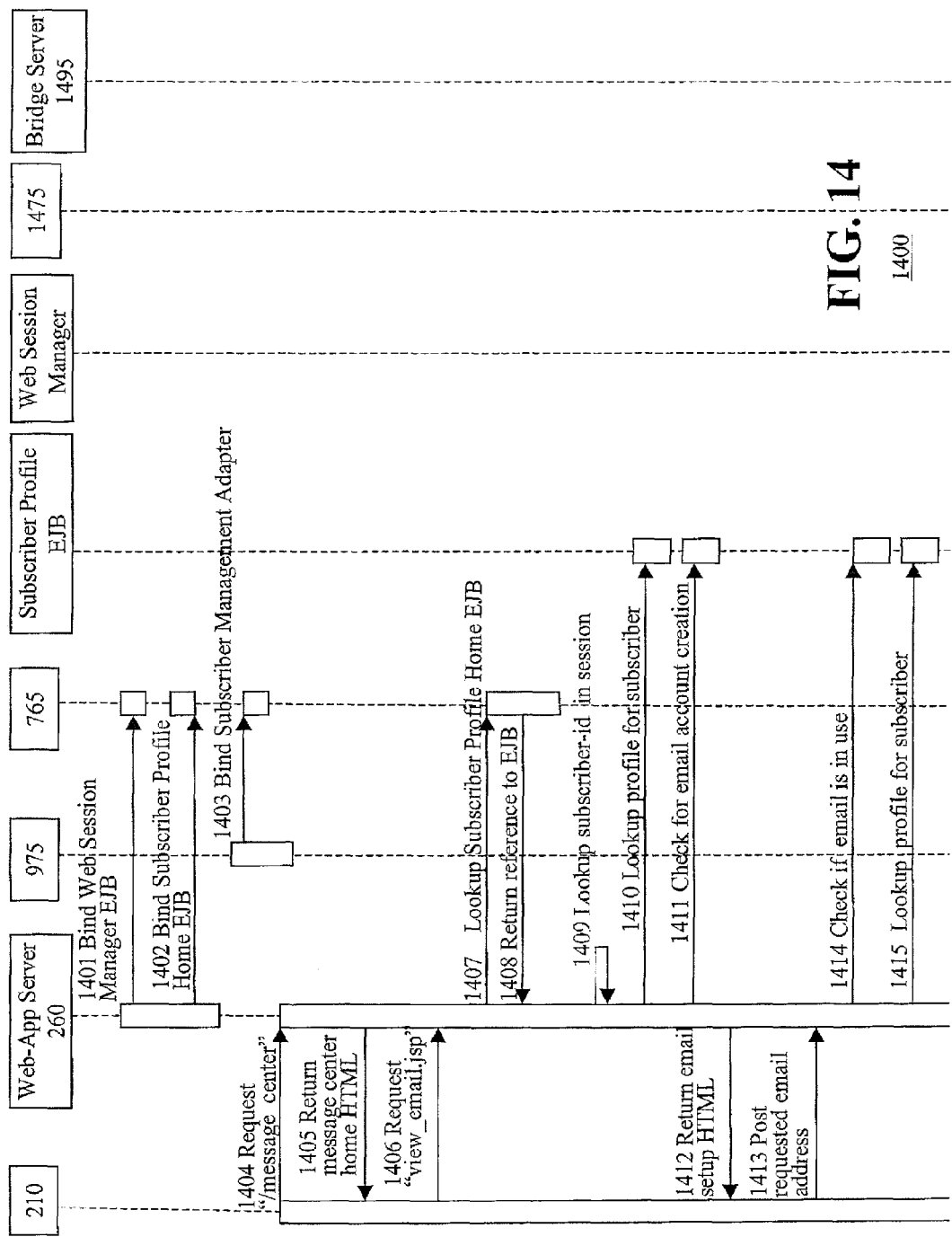
FIG. 14 is a sequence diagram of one embodiment of a method for providing communication services in a vehicle in accordance with the present invention.
Figure 14:
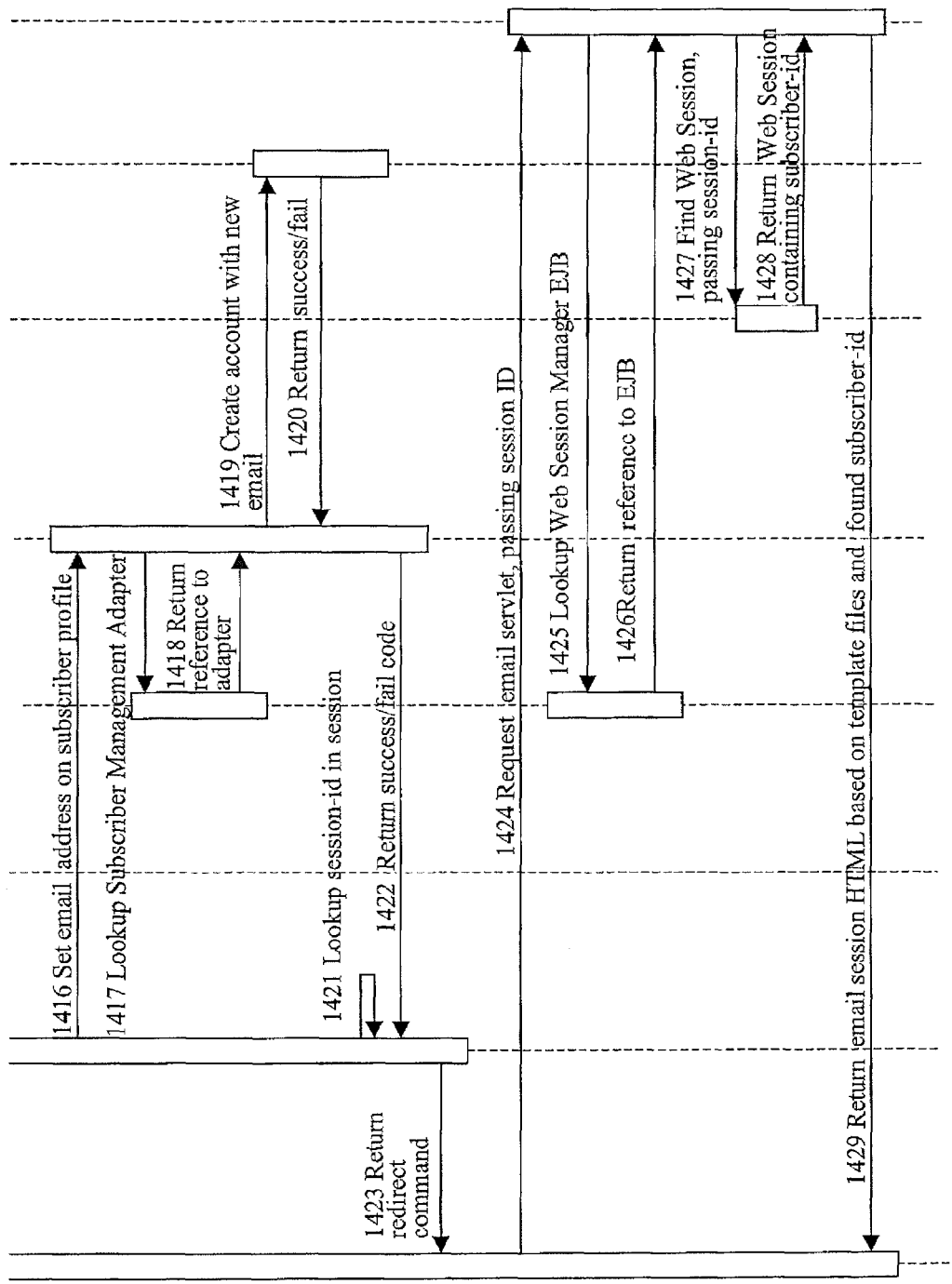

FIG. 14 shows one embodiment of a method for providing a communication service in accordance with the present invention at 1400. In the embodiment of FIG. 14, the communication service is an e-mail service. At step 1401, server 260 may bind a websession manager EJB. At step 1402, server 260 may also bind a subscriber profile home EJB. At step 1403, a server 975, connected to or in communication with service management system 200 may bind a subscriber management adapter 1475. At step 1404, subscriber 210 may send a request to server 260. The request may be, for example, a request to access a message center. At step 1405, server 260 may send a response to subscriber 210. For example, server 260 may send a response in the form of a Message Center Home page rendered via HTML. At step 1406, the subscriber may then send another request to server 260. This request may take the form of, for example, a view_email.jsp. At step 1407, server 260 may lookup a subscriber profile home EJB. At step 1408, middleware components 765 may return a reference to EJB. At step 1409, server 260 may look up subscriber information, such as a subscriber ID, during the session. At step 1410, server 260 may also lookup a profile for the subscriber. At step 1411, server 260 may check if an electronic mail account has been created for the subscriber. At step 1412, server 260 may return a response to subscriber 210. This response may take the form of, for example, a return email setup HTML. At step 1413, subscriber 210 may send another post to server 260. This post may take the form of, for example, a requested email address. At step 1414, server 260 may check if the requested email address is in use. Server 260 may also lookup a profile for the subscriber as seen at step 1415. At step 1416, server 260 may set an email address on the subscriber profile. At step 1417, middleware components 765 may lookup a subscriber management adapter 1475. At step 1418, middleware components 765 may return a reference to the adapter 1475. At step 1419, subscribe profile may create an account with new email. At step 1420, the subscriber management adapter 1475 may return a result code. The result code may take the form of, for example, a code indicating success or failure in creating the new email account. At step 1421, server 260 may lookup a subscriber ID in session. At step 1422, subscribe profile EJB may return a result code. The result code may take the form of a success or fail code. At step 1423, a redirect command may be returned to subscriber 210. At step 1424, subscriber 210 may request email service. This request may take the form of an email servlet. In one embodiment of the invention, this request passes the session ID. At step 1425, a VUI channel host bridge server 1495 may lookup a websession manager EJB. At step 1426, middleware components may return a reference to EJB. At step 1427, VUI channel host bridge server 1495 may find a websession. In one embodiment of the invention, the websession passes the session ID. At step 1428, websession manager may return a websession. In one embodiment of the invention, the websession contains a subscriber ID. At step 1429, VUI channel host bridge server 1495 may return an email response to the subscriber. In one embodiment, of the invention the response takes the form of an email session HTML based on template files and the subscriber ID found at step 1428.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for providing a plurality of services to a user of a vehicle telematics unit, the method comprising:
    defining a plurality of user profiles, wherein each profile is contained in one member of a set of unique objects and is associated with a service in the plurality of services;
    connecting the telematics unit to a service manager;
    receiving a user request for one of the plurality of services from the user at the telematics unit;
    transferring the request from the telematics unit to the service manager;
    at the service manager, retrieving an object containing a profile associated with the user and with the requested service;
    including the retrieved object in a second service request sent from the service manager to a service provider;
    receiving, at the service manager, a response to the second service request from the service provider, the response being tailored to the user based upon the profile contained in the retrieved object; and
    sending the response from the service manager to the telematics unit for communication to the user.

2. The method of claim 1 wherein each service in the plurality of services is coupled to the service manager through a management façade to provide uniformity in at least one of appearance or delivery of service.

3. The method of claim 1 wherein at least one of the unique objects contains a profile controlling default service selection of the service manager.

4. The method of claim 3 wherein the default service selection identifies a plurality of service requests.

5. The method of claim 1 wherein the service provider is a content server.

6. The method of claim 5, further comprising:
- developing content names relating to specific attributes of the service request;
- mapping the content names to multiple content providers;
- receiving, at the content server, data responsive to the content names and supplied by the respective content providers; and
- generating a list of structures containing the data, where a separate structure is generated for each content provider supplying the data.

7. A system for providing a plurality of services to a user, the system comprising:
- a plurality of user profiles, wherein each profile is contained in one member of a set of unique objects and is associated with a service in the plurality of services;
- a service manager configured to i) receive a user request for one of the plurality of services, and ii) retrieve an object containing a profile associated with the user and with the requested service and include the retrieved object in a second service request;
- a service provider configured to receive and to generate a response to the second service request, the response being tailored to the user based upon the profile contained in the retrieved object; and
- a telematics unit configured to be operatively connected to the service manager and to receive the response from the service manager for communication to the user.

8. The system of claim 7, further comprising a management façade coupling each service in the plurality of services to the service manager, the management façade configured to provide uniformity in at least one of appearance or delivery of service.

9. The system of claim 7 wherein at least one of the unique objects contains a profile controlling default service selection of the service manager.

10. The system of claim 9 wherein the default service selection identifies a plurality of service requests.

11. The system of claim 7 wherein the service provider is a content server.

12. The system of claim 11, further comprising multiple content providers configured to receive content names relating to specific attributes of the service request from the content server, and to send data responsive to the content names to the content server.

13. The system of claim 12 wherein the content server is configured to generate a list of structures containing the data, where a separate structure is generated for each content provider supplying the data.

* * * * *